(12) United States Patent
Jung et al.

(10) Patent No.: US 10,785,368 B2
(45) Date of Patent: Sep. 22, 2020

(54) METHOD OF DISPLAYING CONTENTS UPON CALL REQUEST, AND ELECTRONIC DEVICE PROVIDING SAME

(71) Applicant: Samsung Electronics Co., Ltd., Gyeonggi-do (KR)

(72) Inventors: Hoonsoub Jung, Gyeongsangbuk-do (KR); Kyungkeun Lee, Daegu (KR); Yeunwook Lim, Daegu (KR)

(73) Assignee: Samsung Electronics Co., Ltd (KR)

( * ) Notice: Subject to any disclaimer, the term of this patent is extended or adjusted under 35 U.S.C. 154(b) by 236 days.

(21) Appl. No.: 15/329,142

(22) PCT Filed: Jul. 31, 2015

(86) PCT No.: PCT/KR2015/008068
§ 371 (c)(1),
(2) Date: Jan. 25, 2017

(87) PCT Pub. No.: WO2016/018128
PCT Pub. Date: Feb. 4, 2016

(65) Prior Publication Data
US 2017/0214789 A1 Jul. 27, 2017

(30) Foreign Application Priority Data
Jul. 31, 2014 (KR) .................. 10-2014-0098595

(51) Int. Cl.
*H04W 4/16* (2009.01)
*H04M 1/725* (2006.01)
(Continued)

(52) U.S. Cl.
CPC ....... *H04M 1/72583* (2013.01); *H04M 1/575* (2013.01); *H04W 4/16* (2013.01); *H04W 88/02* (2013.01)

(58) Field of Classification Search
CPC ... H04M 1/72583; H04M 1/575; H04W 4/16; H04W 4/21; H04W 4/23; H04W 88/02
See application file for complete search history.

(56) References Cited

U.S. PATENT DOCUMENTS 7,711,384 B1 * 5/2010 Szuszczewicz ... H04M 3/42365
379/202.01
8,090,081 B2 1/2012 Kent, Jr. et al.
(Continued)

FOREIGN PATENT DOCUMENTS

CN 103685728 3/2014
KR 1020080095629 10/2008
(Continued)

OTHER PUBLICATIONS

GUID Guide for Data Providers [online]. iDigBio Florida State University, Dec. 14, 2012 [retrieved on Oct. 30, 2018]. Retrieved from the Internet <URL: https://www.idigbio.org/sites/default/files/iDigBioGuidGuideForProviders_v1.pdf>.*

(Continued)

*Primary Examiner* — Beau D Spratt
(74) *Attorney, Agent, or Firm* — The Farrell Law Firm, P.C.

(57) ABSTRACT

The present invention, with respect to an electronic device, discloses an electronic device including: a communication unit that transmits a signal requesting a call to another electronic device and receives screen display information from the another electronic device; and a processor that controls so as to display a user interface based on the screen display information on a call connection screen. The present invention is not limited to the above embodiment, however, and other embodiments are possible.

12 Claims, 25 Drawing Sheets

(51) Int. Cl.
H04M 1/57 (2006.01)
H04W 88/02 (2009.01)

(56) References Cited

U.S. PATENT DOCUMENTS

| | | | | |
|---|---|---|---|---|
| 2003/0138087 A1* | 7/2003 | Takeda | ............ | H04M 1/663 379/207.02 |
| 2005/0091190 A1* | 4/2005 | Klemets | ............ | H04L 12/1895 |
| 2005/0141687 A1* | 6/2005 | Ozugur | ............ | H04M 3/60 379/201.02 |
| 2005/0143135 A1* | 6/2005 | Brems | ............ | H04M 1/72519 455/564 |
| 2005/0172001 A1* | 8/2005 | Zaner | ............ | H04L 29/06 709/205 |
| 2006/0003783 A1* | 1/2006 | Fukui | ............ | H04W 4/10 455/517 |
| 2007/0026852 A1* | 2/2007 | Logan | ............ | H04M 1/72561 455/422.1 |
| 2009/0275310 A1* | 11/2009 | Fletcher | ............ | H04L 67/06 455/412.1 |
| 2010/0107122 A1 | 4/2010 | Jung | | |
| 2011/0228727 A1* | 9/2011 | Julo | ............ | G01S 19/16 370/328 |
| 2011/0248822 A1* | 10/2011 | Sarihan | ............ | H04N 7/15 340/5.81 |
| 2013/0321340 A1* | 12/2013 | Seo | ............ | H04M 1/0214 345/174 |
| 2014/0089805 A1 | 3/2014 | Song et al. | | |
| 2014/0171149 A1* | 6/2014 | Jung | ............ | H04M 3/42 455/556.1 |

FOREIGN PATENT DOCUMENTS

| | | |
|---|---|---|
| KR | 100881657 | 2/2009 |
| KR | 1020100034424 | 4/2010 |
| KR | 101127667 | 3/2012 |
| KR | 1020130119775 | 11/2013 |

OTHER PUBLICATIONS

PCT/ISA/210 Search Report issued on PCT/KR2015/008068 (pp. 3).

PCT/ISA/237 Written Opinion issued on PCT/KR2015/008068 (pp. 9).

Chinese Office Action dated Jul. 8, 2019 isused in counterpart application No. 201580040624.9, 23 pages.

* cited by examiner

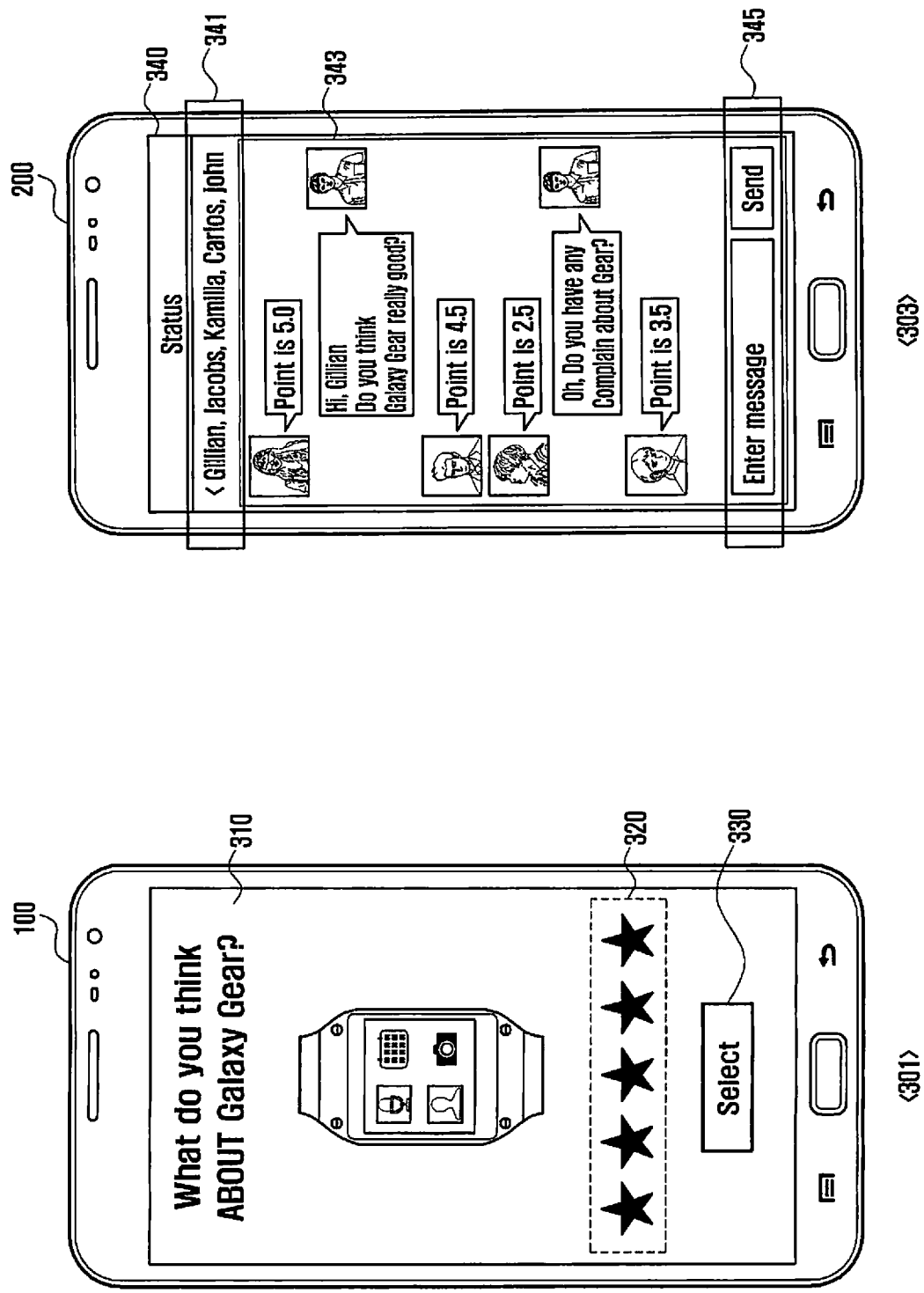

FIG. 11A

```
Example:
{ "data" : { "def_lang" : "en", "time_t" : 0, "time_f" : 0, "hash" :
"4a7d75236b3f1164444d2b9ec57a3c0ffc3501b6", "action" : "create_new"}
```

⟨1101⟩

```
/img
/css
/js
/data/input.data
index.html
thumb.png
```

```
input.data

[{"name":"description", "type":"text",
"uservalue":""},
{"name":"photo", "type":"image"}]
```

⟨1103⟩

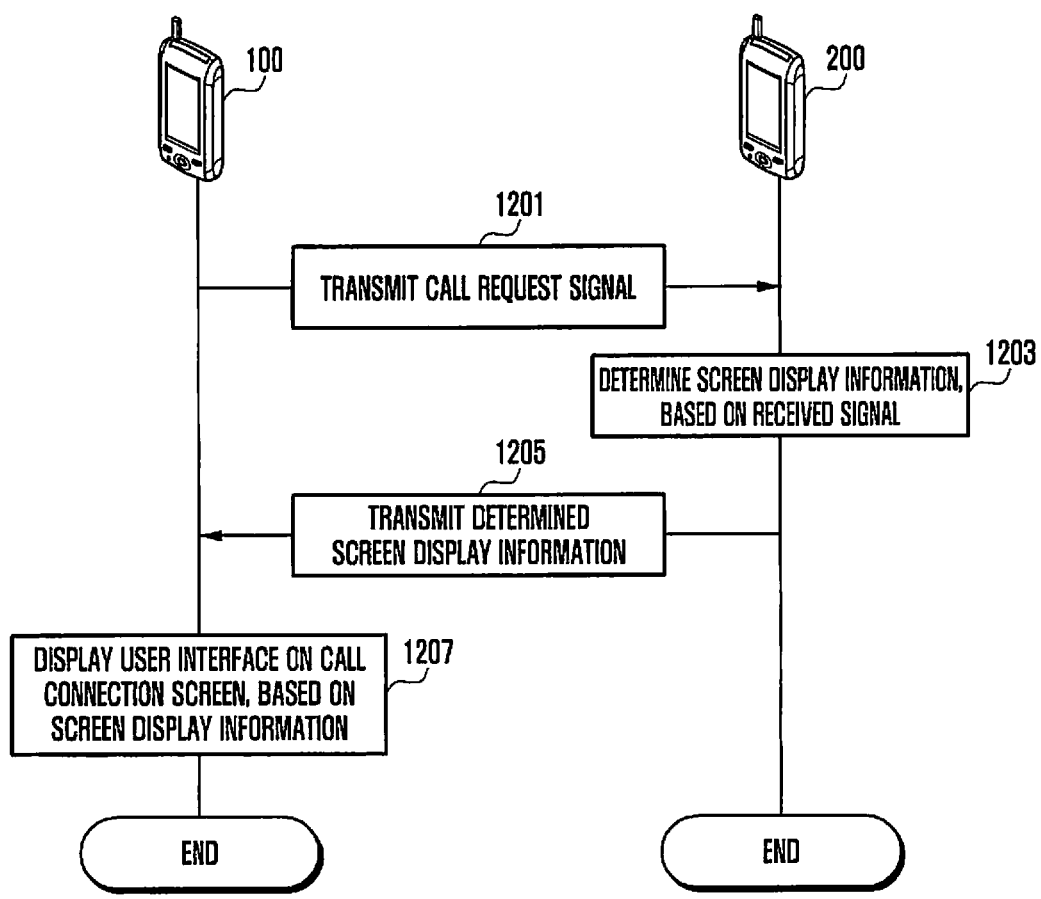

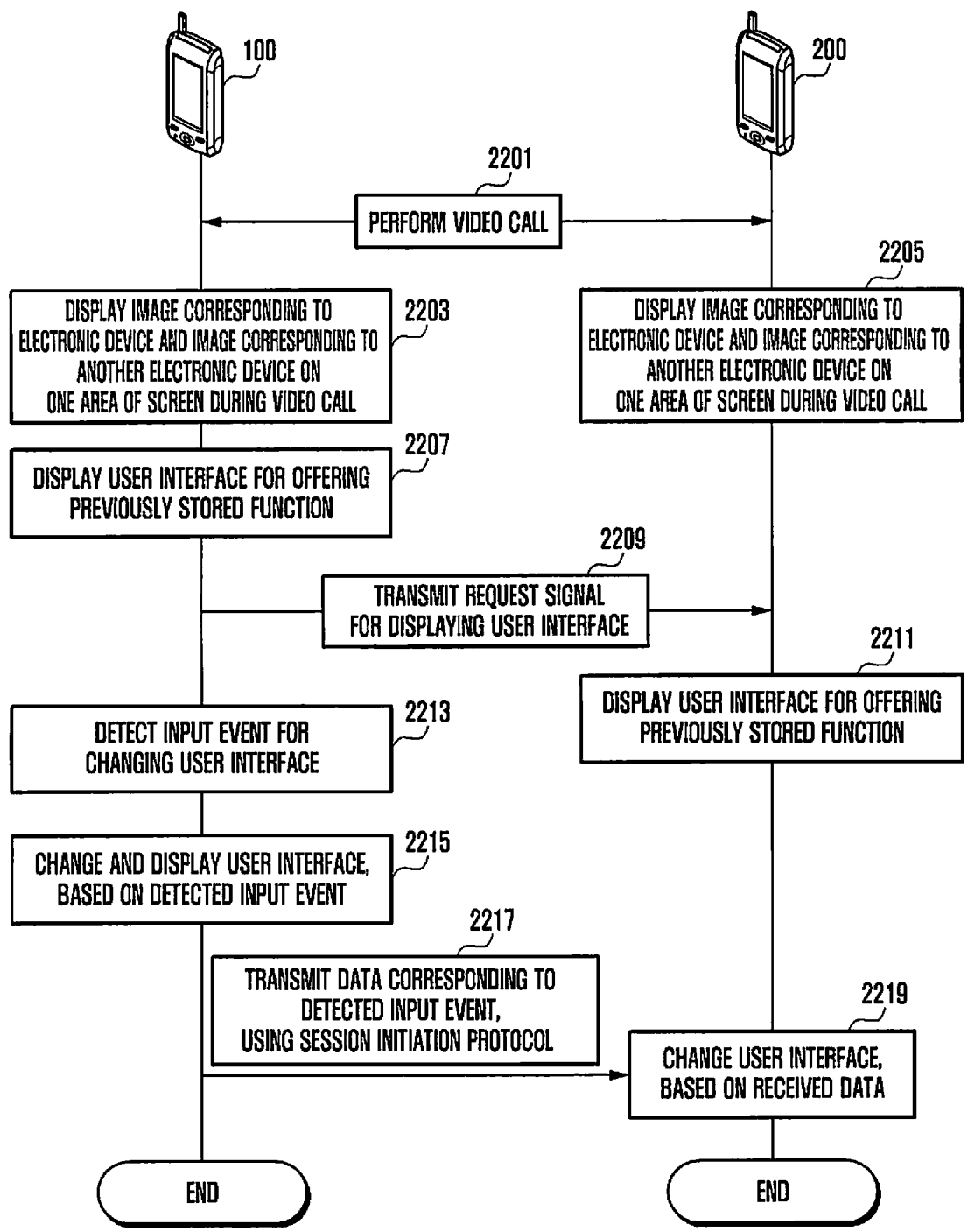

METHOD OF DISPLAYING CONTENTS UPON CALL REQUEST, AND ELECTRONIC DEVICE PROVIDING SAME

PRIORITY

This application is a National Phase Entry of PCT International Application No. PCT/KR2015/008068 which was filed on Jul. 31, 2015, and claims priority to Korean Patent Application No. 10-2014-0098595, which was filed on Jul. 31, 2014, the contents of each of which are incorporated herein by reference.

TECHNICAL FIELD

The present invention relates to a method for displaying content at a call request and to an electronic device for providing the method. More particularly, the present invention relates to a content display method based on screen display information received from another electronic device at a call request or during a call and to an electronic device for providing the method.

BACKGROUND ART

In these days, various electronic devices have been rapidly popularized to modern people. Such electronic devices are now evolving into those of replaying multimedia data such as images or audios as well as offering an inherent voice call service and various data transmission services.

In addition, users of electronic devices increasingly tend to share their contents (e.g., photos, videos, etc.), thus having a great interest in a manner of performing communication between electronic devices.

Recently, Rich Communication Suite (RCS) or Rich Communication Suite-enhanced (RCS-e) based on a standard specification proposed by the Global System for Mobile Communications Association (GSMA) is provided as an example of communication between electronic devices. For example, using RCS or RCS-e, electronic devices can share images during a voice call.

DISCLOSURE OF INVENTION

Technical Problem

In a prior art, when a call request signal is received, an electronic device merely displays a caller's phone number and name information on a screen and offers a simple voice information delivery function only. This causes a problem that a recipient who receives a call request fails to identify a caller's state.

Similarly, when a call request signal is transmitted, an electronic device merely displays a recipient's phone number and name information on a screen and offers a simple voice information delivery function only. This causes a problem that a caller who is requesting a call fails to identify a recipient's state.

Additionally, in order to share information or request information for data acquisition, electronic devices are required to use a separate application or program. This causes a problem of deteriorating the speed and accessibility of user's information exchange.

Further, an electronic device is required to execute a separate application for data communication when a user wants an additional operation during a call. This causes a problem of lowering usability.

Therefore, in order to obviate the above problems, embodiments described below relate to a method for displaying content at a call request and to an electronic apparatus for providing the method.

Solution to Problem

According to an embodiment of this invention, an electronic device may include a communication unit configured to transmit a call request signal to another electronic device and to receive screen display information from the another electronic device; and a processor configured to control a user interface to be displayed on a call connection screen, based on the screen display information.

According to an embodiment of this invention, an electronic device may include a communication unit configured to transmit a call request signal to another electronic device and to receive screen display information from the another electronic device; and a processor configured to control a user interface to be displayed, based on the screen display information, and to, when a call-disabled response signal indicating a failure in a call from the another electronic device through the communication unit, control the user interface to be changed to a call-disabled user interface corresponding to the received call-disabled response signal.

According to an embodiment of this invention, an electronic device may include a communication unit configured to receive a call request signal from another electronic device; and a processor configured to determine screen display information to be delivered to the another electronic device, based on the received signal, and to control the determined screen display information to be transmitted to the another electronic device through the communication unit.

According to an embodiment of this invention, an electronic device may include a communication unit configured to receive a call request signal from another electronic device and to receive screen display information from the another electronic device; and a processor configured to determine screen display information to be delivered to the another electronic device, based on the received signal, to control the determined screen display information to be transmitted to the another electronic device through the communication unit, and to control a user interface to be displayed, based on the received screen display information.

According to an embodiment of this invention, an electronic device may include a communication unit configured to receive a call request signal from another electronic device and to receive data corresponding to a selection item and a command item contained in the user interface from the another electronic device; and a processor configured to determine screen display information to be delivered to the another electronic device, based on the received signal, to control the determined screen display information to be transmitted to the another electronic device through the communication unit, to identify group information including user information corresponding to the another electronic device, based on the received data, and to control the data corresponding to the selection item and the command item to be displayed on a group message user interface created based on the group information.

According to an embodiment of this invention, an electronic device may include a communication unit configured to receive a call request signal from another electronic device; and a processor configured to determine screen display information to be delivered to the another electronic device, based on the received signal, to control the determined screen display information to be transmitted to the another electronic device through the communication unit, to transmit a call-disabled signal indicating a failure in a call to the another electronic device through the communication unit, to control a text user interface or an audio user interface to be displayed, to store an input on the text user interface or the audio user interface, to create text message data or audio message data, based on the stored input, and to control the created text message data or the created audio message data to be transmitted to the another electronic device through the communication unit.

According to an embodiment of this invention, an electronic device may include a communication unit configured to establish a call connection with another electronic device and to receive data from the another electronic device during the call connection with the another electronic device; and a processor configured to control a user interface to be displayed on one area of a call establishment screen, based on the received data.

Advantageous Effects of Invention

According to an embodiment of this invention, an electronic device receives screen display information from any another electronic device at the time of a call request, thus improving the speed and accessibility of information sharing.

According to an embodiment of this invention, a transmitting electronic device that sends a call request can receive status information of a receiving electronic device for performing a call, thus quickly obtaining information about a user's state of the receiving electronic device.

According to an embodiment of this invention, an electronic device can transmit a hash code created using content creation time information to another electronic device, thus increasing a reaction time for displaying content on a screen and sharing latest content between users.

BRIEF DESCRIPTION OF DRAWINGS

FIGS. 3 and 4 schematically illustrate transmission/reception of screen display information between electronic devices according to an embodiment.

FIGS. 11A and 11B illustrate an example of a data structure regarding a user interface according to an embodiment.

FIG. 12 illustrates a flow diagram for displaying content of an electronic device according to an embodiment.

FIG. 22 illustrates a flow diagram for performing a video call between electronic devices according to an embodiment.

MODE FOR THE INVENTION

Figure 1:
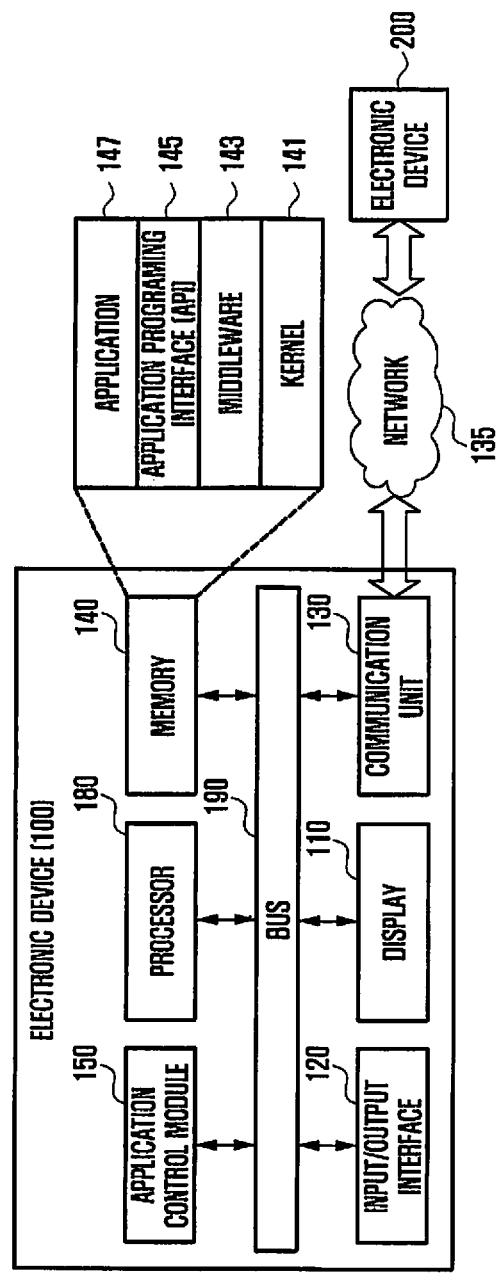
FIG. 1 illustrates a network environment including an electronic device according to various embodiments.

Hereinafter, various embodiments will be described with reference to the accompanying drawings. In the drawings, the same element will be indicated by the same reference numeral, if possible. In addition, well known functions and configurations will not be described in detail. In the following, necessary parts for understanding operations according to various embodiments of this invention will be described, and the others may not be described to avoid obscuring the subject matter of the present invention.

Expressions such as first, second, etc., used in various embodiments of this invention, may merely indicate various elements of various embodiments rather than limiting such elements. For example, the above expressions do not limit the sequence and/or importance of the elements. The above expressions are used merely for the purpose of distinguishing one element from the other elements. For example, the first electronic device and the second electronic device indicate different electronic devices although both are electronic devices.

The terms used in various embodiments of this invention are only used to describe specific embodiments and are not intended to limit such embodiments. Singular forms are intended to include plural forms unless the context clearly indicates otherwise.

An electronic device according to various embodiments of the present invention may be a device having a communication function. For example, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or an wearable device (e.g., a head-mounted-device (HMD) such as electronic glasses, electronic clothes, an electronic bracelet, an electronic necklace, an electronic appccessory, an electronic tattoo, or a smart watch).

According to a certain embodiment, an electronic device may include at least one of furniture or a portion of a building/structure that has a communication function, an electronic board, an electronic signature receiving device, a projector, or a variety of measuring devices (e.g., a water meter, an electricity meter, a gas meter, a radio wave meter, and the like). An electronic device according to various embodiments of this invention may be one or a combination of the aforementioned various electronic devices. Also, an electronic device according to various embodiments of this invention may be a flexible device. It is apparent to those skilled in the art that an electronic device according to this invention is not limited to the aforementioned devices.

FIG. 1 illustrates a network environment 135 including an electronic device 100 according to various embodiments. Referring to FIG. 1, the electronic device 100 may include a display 110, an input/output (I/O) interface 120, a communication unit 130, a memory 140, an application control module 150, and a processor 180.

The display 110 displays information inputted by or to be offered to a user, including various kinds of menus of the electronic device 100. Namely, the display 110 may offer various screens such as an idle screen, a menu screen, a message creation screen, a call screen, and the like in connection with the use of the electronic device 100. The display 110 may be formed of a liquid crystal display (LCD), an organic light emitted diode (OLED), or the like, and may be included in an input unit. The electronic device 100 may offer various menu screens that can be performed on the basis of the display 110 which is supportable.

The display 110 may be combined with a touch panel and thereby provided in the form of a touch screen. For example, the touch screen may be formed of an integrated module in which a display panel and a touch panel are combined in a stack structure. The touch panel may recognize a user's touch input, for example, in a capacitive manner, a pressure sensitive manner, an infrared manner, or an ultrasonic manner. The touch panel may further include a controller (not shown). Meanwhile, in case of the capacitive manner, proximity recognition in addition to direct touch may be possible. The touch panel may further include a tactile layer. In this case, the touch panel may offer a tactile response to the user. According to an embodiment, the display 110 may detect a touch input event that requests the electronic device 100 to perform a function. The display 110 may deliver, to the processor 180, information corresponding to the detected touch input event.

The I/O interface 120 may deliver commands or data entered from a user through an I/O unit (e.g., a sensor, a keyboard, or a touch screen) to the memory 140, the processor 180, etc. through a bus 190. For example, the I/O interface 120 may offer, to the processor 180, data regarding a user's touch entered through the touch screen.

The communication unit 130 is a communication module for supporting a mobile communication service of the electronic device 100. The communication unit 130 establishes a communication channel with a mobile communication system. For this, the communication unit 130 may include a radio frequency (RF) transmitter to up-convert the frequency of an outgoing signal and to amplify the up-converted signal, and an RF receiver to low-noise-amplify an incoming signal and to down-convert the frequency of the amplified signal. For example, wireless communication supported by the communication unit 130 may include at least one of wireless fidelity (Wifi), Bluetooth (BT), near field communication (NFC), global positioning system (GPS), or cellular communication (e.g., LTE, CDMA, WCDMA, UMTS, WiBro or GSM). Wired communication supported by the communication unit 130 may include at least one of a universal serial bus (USB), a high definition multimedia interface (HDMI), a recommended standard 232 (RS-232), or a plain old telephone service (POTS).

According to an embodiment of this invention, the communication unit 130 may transmit a signal for requesting a call to another electronic device (e.g., an electronic device 200). This call request signal may contain additional information for identifying the electronic device 100 (e.g., packet information, ID information of the electronic device 100, manufacturer information of the electronic device 100, call application information of the electronic device 100, or unique ID information of an application created by a separate input). The communication unit 130 may receive screen display information, to be displayed on a call connection screen, from another electronic device (e.g., the electronic device 200).

According to an embodiment of this invention, the communication unit 130 may receive, from another electronic device (e.g., the electronic device 200), authority information for identifying status information of the another electronic device (e.g., the electronic device 200). For example, the communication unit 130 may receive, from another electronic device (e.g., the electronic device 200), authority information for identifying status information (e.g., silent mode setting information, drive mode setting information, charging state information, proximity communication activation information, or earphone connection information) of the another electronic device (e.g., the electronic device 200).

According to an embodiment of this invention, the communication unit 130 may receive, from another electronic device (e.g., the electronic device 200), a call-disabled response signal indicating a failure in a call. For example, the communication unit 130 may receive the call-disabled response signal from another electronic device (e.g., the electronic device 200) when a call is not established for a predetermined threshold time or when another electronic device (e.g., the electronic device 200) rejects a call.

According to an embodiment of this invention, the communication unit 130 may transmit, to another electronic device (e.g., the electronic device 200), a hash code created using at least one of title information, description information, phone number information, and creation time information, which correspond to a user interface. This hash code may be created using characteristics of Secure Hash Algorithm 1 (SHA1), which is an algorithm that outputs a unique value as a result value generated from an input value. For example, the hash code may be created using all of title information, description information, phone number information, and creation time information, all of which correspond to a user interface.

According to an embodiment of this invention, the communication unit 130 may receive a call request signal from another electronic device (e.g., the electronic device 200). According to an embodiment, the communication unit 130 may receive screen display information from another electronic device (e.g., the electronic device 200). Herein, the call request signal from another electronic device (the electronic device 200) may contain screen display information received through the communication unit 130. According to an embodiment, the screen display information to be displayed on a call response screen may be contained in a separate signal received from another electronic device (e.g., the electronic device 200). For example, the screen display information to be displayed on a call connection screen of the electronic device 100 may be contained in a data sharing signal, a data delivery signal, etc. received from another electronic device (e.g., the electronic device 200).

According to an embodiment of this invention, the communication unit 130 may receive, from another electronic device (e.g., the electronic device 200), data corresponding to a selection item and a command item contained in a user interface.

According to an embodiment of this invention, the communication unit 130 may transmit, to another electronic device (e.g., the electronic device 200), authority information for identifying status information of the electronic device 100. For example, the communication unit 130 may transmit, to another electronic device (e.g., the electronic device 200), authority information for identifying status information (e.g., silent mode setting information, drive mode setting information, charging state information, proximity communication activation information, or earphone connection information) of the electronic device 100. According to an embodiment, when a signal for requesting status information of the electronic device 100 based on the authority information is received from another electronic device (e.g., the electronic device 200), the communication unit 130 may transmit the status information of the electronic device 100 to another electronic device (e.g., the electronic device 200).

According to an embodiment of this invention, the communication unit 130 may transmit, to another electronic device (e.g., the electronic device 200), a call-disabled signal indicating a failure in a call. For example, after a call request signal is received from another electronic device (e.g., the electronic device 200), the communication unit 130 may transmit the call-disabled signal indicating a failure in a call to the another electronic device (e.g., the electronic device 200).

The memory 140 may store commands or data received from or created by the processor 180 or other elements (e.g., the display 110, the I/O interface 120, the communication unit 130, or the application control module 150). The memory 140 may include programming modules such as, for example, a kernel 143, a middleware 144, an application programming interface (API) 145, or an application 147. Each of these programming modules may be composed of software, firmware, hardware, or a combination thereof.

According to an embodiment of this invention, the memory 140 may store screen display information, user interface information, application information, and the like. Herein, user interface information may be a unique ID of an user interface, and application information may be a unique ID of a user-created application different from an application received through a separate server.

The kernel 143 may control or manage system resources (e.g., the memory 140 or the processor 180) used to execute operations or functions implemented in the other programming modules, e.g., the middleware 144, the API 145, or the application 147.

The middleware 144 may perform a relaying function such that the API 145 or the application 147 can communicate with the kernel 143 to exchange data.

The API 145 is an interface for the application 147 to control a function offered by the kernel 143 or the middleware 144 and may include at least one interface or function (e.g., a command) for a file control, a window control, an image processing, a character control, and/or the like.

According to various embodiments, the application 147 may include an SMS/MMS application, an email application, a calendar application, an alarm application, a health care application (e.g., an application that measures an activity or a blood sugar), or an environmental information application (e.g., an application that offers atmosphere information, humidity information, or temperature information).

According to various embodiments, the application 147 may include an application that is specified depending on attributes (e.g., the type of an electronic device) of an external electronic device (e.g., the electronic device 200). For example, if the electronic device 200 is an MP3 player, the application 147 may include an application associated with a music playback. Similarly, if the electronic device 200 is a mobile medical device, the application 147 may include an application associated with a health care. According to an embodiment, the application 147 may include at least one of an application specified in the electronic device 100 or an application received from an external electronic device (e.g., the electronic device 200).

The application control module 150 may process at least part of information obtained from other elements (e.g., the I/O interface 120, the communication unit 130, the memory 140, or the processor 180) and then offer this to a user in various manners. For example, the application control module 150 may recognize information about components equipped in the electronic device 100, store the recognized information in the memory 140, and execute the application 147 based on the recognized information.

According to an embodiment, the network 135 may be a telecommunications network. The telecommunications network may include at least one of a computer network, an internet, an internet of things, or a telephone network. According to an embodiment, a protocol (e.g., a transport layer protocol, a data link layer protocol, or a physical layer protocol) for communication between the electronic device 101 and an external device may be supported by at least one of the communication unit 130, the kernel 143, the middleware 144, the API 145, or the application 147. According to an embodiment, using RCS Bearer, the electronic devices 100 and 200 may transmit and receive data and screen display information.

The external electronic device (e.g., the electronic device 200) may have a structure for performing the same or similar functions as or to those of the display 110, the I/O interface 120, the communication unit 130, the memory 140, the application control module 150 and the processor 180 which may be included in the electronic device 100.

The processor 180 may, for example, receive a command from other elements (e.g., the display 110, the I/O interface 120, the communication unit 130, the memory 140, or the application control module 150) through the bus 190, decode the received command, and perform a particular operation or data processing in accordance with the decoded command.

According to an embodiment of this invention, the processor 180 may control a user interface to be displayed on the basis of the screen display information received through the communication unit 130. For example, the processor 180 may control a user interface to be displayed on a call connection screen, based on the screen display information received from another electronic device (e.g., the electronic device 200). The user interface may contain a shortcut icon or thumbnail image for performing a predefined function, text data for offering information, or audio data for outputting audio.

According to an embodiment, the processor 180 may control the received screen display information, a user interface, etc. to be stored in the memory 140. For example, in case of transmitting a signal for requesting a call to another electronic device (e.g., the electronic device 200) through the communication unit 130, the processor 180 may control the user interface to be displayed on the basis of the screen display information that corresponds to another electronic device (e.g., the electronic device 200) and is previously stored in the memory 140.

According to an embodiment, the processor 180 may control a hash code, created using the screen display information stored in the memory 140, to be transmitted to another electronic device (e.g., the electronic device 200) through the communication unit 130. The processor 180 may control the communication unit 130 to receive, from another electronic device (e.g., the electronic device 200), a signal indicating the coincidence of the hash code or updated screen display information. For example, when a signal indicating the coincidence of the hash code is received, the processor 180 may control a user interface to be displayed on the call connection screen, based on the screen display information previously stored in the memory 140. The hash code may be a code created using at least one of title information, phone number information, creation time information and description information of the user interface.

According to an embodiment, if data traffic from and to another electronic device (e.g., the electronic device 200) is smaller than a predefined threshold (e.g., 1 Mbps (Mega bit per second), 3.0 Mbps, etc.), the processor 180 may control a user interface to be displayed on the call connection screen, based on the screen display information previously stored in the memory 140. The predefined threshold may be varied.

According to an embodiment, if the screen display information is received in the form of a compressed file through the communication unit 130, the processor 180 may decompress the screen display information to identify the screen display information. Then based on the identified screen display information, the processor 180 may control a user interface to be displayed on the call connection screen.

According to an embodiment of this invention, the processor 180 may detect an input event on a selection item and a command item contained in a user interface, and control data corresponding to the selection item and the command item to be transmitted to another electronic device (e.g., the electronic device 200). According to an embodiment, the user interface may be formed of an image item, a thumbnail image, a shortcut icon, etc., which offer a plurality of functions.

A user interface may have a selection item for selecting a rating for a specific medium (e.g., a star-shaped image item, a numerical image item, etc.), and a command item for sending information to another electronic device (e.g., the electronic device 200). For example, when the processor 180 detects an input of selecting three stars through the selection item and also detects an input on the command item for delivering information, the processor 180 may transmit data corresponding to selection of three stars to another electronic device (e.g., the electronic device 200).

In another example, a user interface may have an image item (e.g., a thumbnail image, a shortcut icon, etc.) for selecting a specific seat from among a plurality of seats, and a command item for sending information about the selected image item to another electronic device (e.g., the electronic device 200). For example, when the processor 180 detects an input event of selecting the second seat from the left of the third column among a plurality of seats and also detects an input on the command item for delivering data corresponding to the detected input event, the processor 180 may transmit data including information about selection of the second seat from the left side of the third column to another electronic device (e.g., the electronic device 200).

According to an embodiment of this invention, the processor 180 may control a request signal for status information of another electronic device (e.g., the electronic device 200) to be transmitted through the communication unit 130, based on the received authority information. According to an embodiment, the processor 180 may control status information of another electronic device (e.g., the electronic device 200) to be received in response to a request signal for the status information of the another electronic device (e.g., the electronic device 200) through the communication unit 130 from the another electronic device (e.g., the electronic device 200). The status information may be silent mode setting information, drive mode setting information, charging state information, proximity communication activation information, earphone connection information, and the like.

According to an embodiment of this invention, the processor 180 may identify, through the communication unit 130, a call-disabled signal that indicates a failure in a call with another electronic device (e.g., the electronic device 200). Based on the identified call-disabled signal, the processor 180 may control a user interface being displayed on a screen to be changed to a call-disabled user interface corresponding to the call-disabled response signal. The call-disabled signal received through the communication unit 130 may contain screen display information for displaying the call-disabled user interface.

According to an embodiment of this invention, the processor 180 may receive a call request signal from another electronic device (e.g., the electronic device 200) through the communication unit 130. Based on the received signal, the processor 180 may determine screen display information to be delivered to another electronic device (e.g., the electronic device 200). For example, the processor 180 may identify user information contained in a call request signal received from another electronic device (e.g., the electronic device 200) and then determine screen display information corresponding to the identified user information. For example, when user information corresponding to another electronic device (e.g., the electronic device 200) is determined as screen display information A, the processor 180 may control the screen display information A to be transmitted to another electronic device (e.g., the electronic device 200).

According to an embodiment, the processor 180 may control screen display information to be received from another electronic device (e.g., the electronic device 200) through the communication unit 130. Based on the received screen display information, the processor 180 may control a user interface to be displayed on a call response screen.

According to an embodiment, if data traffic from and to another electronic device (e.g., the electronic device 200) is smaller than a predefined threshold (e.g., 1 Mbps (Mega bit per second), 3.0 Mbps, etc.), the processor 180 may control a user interface to be displayed on a call response screen, based on screen display information previously stored in the memory 140. For example, the processor 180 may compare a hash code received from another electronic device (e.g., the electronic device 200) with a hash code corresponding to display information to be delivered, and if the comparison result is not satisfactory (e.g., if the network 135 is not connected or in case of being smaller than a predefined threshold (e.g., 3.0 Mbps, 5.0 Mbps, etc.), may control the user interface to be displayed on the basis of the previously stored screen display information.

According to an embodiment, the processor 180 may determine display information, based on a hash code received from another electronic device (e.g., the electronic device 200). The hash code may be a code created using at least one of title information, description information, phone number information, and creation time information, which correspond to a user interface. For example, when a hash code is received from another electronic device through the communication unit 130, the processor 180 may compare the received hash code with a hash code corresponding to screen display information to be delivered to another electronic device (e.g., the electronic device 200). According to an embodiment, when a hash code is created using creation time information, the processor 180 may determine whether the hash code received from another electronic device (e.g., the electronic device 200) is identical with the hash code to be transmitted to another electronic device (e.g., the electronic device 200).

According to an embodiment, based on the comparison result, the processor 180 may determine screen display information to be delivered to another electronic device (e.g., the electronic device 200). For example, if the hash code received from another electronic device (e.g., the electronic device 200) is identical with the hash code to be received, the processor 180 may determine that the latest screen display information is stored in the memory of another electronic device (e.g., the electronic device 200), and then may transmit a signal indicating that the hash codes are identical with each other. In another example, if the hash code received from another electronic device (e.g., the electronic device 200) is not identical with the hash code to be received, the processor 180 may transmit updated screen display information to another electronic device (e.g., the electronic device 200).

According to an embodiment of this invention, the processor 180 may identify group information including user information corresponding to another electronic device (e.g., the electronic device 200), based on data received through the communication unit 130. For example, the processor 180 may determine a group having user information corresponding to another electronic device (e.g., the electronic device 200) among group information previously stored in the memory 140. For example, the memory 140 may previously store group information including user information which corresponds to each of external electronic devices. When a call request signal or equivalent signal is received from any external electronic device, the processor 180 may extract group information including user information corresponding to the external electronic device, based on the received signal.

According to an embodiment of this invention, the processor 180 may control the determined screen display information to be converted into an HTML form and then transmitted to another electronic device (e.g., the electronic device 200), or to be compressed and then transmitted to another electronic device (e.g., the electronic device 200). According to another embodiment, when there is no call request, the processor 180 may control screen display information to be transmitted to another electronic device (e.g., the electronic device 200) in response to detection of a specific command input event.

According to an embodiment, the processor 180 may receive data corresponding to a selection item and a command item from another electronic device (e.g., the electronic device 200) through the communication unit 130. The processor 180 may control the received data corresponding to the selection item and the command item to be displayed on a group message user interface created on the basis of group information. For example, the user interface may be formed of an image item, a thumbnail image, a shortcut icon, etc. for offering a plurality of functions. For example, the user interface may have a selection item for selecting a rating for a specific medium (e.g., a star-shaped image item, a numerical image item, etc.), and a command item for sending information to another electronic device (e.g., the electronic device 200).

For example, the processor 180 may identify group information that includes user information corresponding to another electronic device (e.g., the electronic device 200). The processor 180 may control data corresponding to a selection item and a command item, received from through the communication unit 130, to be displayed on a group message user interface (e.g., a group chat form, a group chat window, etc.) through which a plurality of users can send and receive text messages.

The group message user interface may accumulatively display data corresponding to users included in the identified group. Alternatively, the group message user interface may be controlled to display text data entered in the form of a time history of text from each user. For example, the processor 180 may transmit screen display information associated with the group message user interface such that the group message user interface can be displayed on another electronic device (e.g., the electronic device 200).

In another example, the processor 180 may receive data corresponding to a command item displayed on a user interface through the communication unit 130. The user interface may offer information about seat reservation. The processor 180 may receive selected seat number data, total price data, etc. from another electronic device (e.g., the electronic device 200) through the communication unit 130.

According to an embodiment of this invention, the processor 180 may control a call-disabled request signal to be transmitted to another electronic device (e.g., the electronic device 200) through the communication unit 130, and then control a text user interface or an audio user interface to be displayed on a screen. The processor 180 may control an input on the text user interface or the audio user interface to be stored in the memory 140. For example, the processor 180 may store, in the memory 140, a message of call-disabled reason, such as being in a conference, through an input using the text user interface.

The processor 180 may create text message data or audio message data, based on the stored input, and control the text message data or the audio message data to be transmitted to another electronic device (e.g., the electronic device 200) through the communication unit 130.

According to an embodiment of this invention, the processor 180 may control a user interface to be displayed on the basis of screen display information received through the communication unit 130. The processor 180 may receive the screen display information when requesting a call to another electronic device (e.g., the electronic device 200), when a call is established (e.g., during a call) with another electronic device (e.g., the electronic device 200), at the end of a call (e.g., when a call termination request signal is received, etc.), or in a call standby state (e.g., when no call is performed, etc.).

According to an embodiment, when a call is established (e.g., during a call) with another electronic device (e.g., the electronic device 200), or when a call is ended (e.g., when a call termination request signal is received, etc.), the processor 180 may control a user interface to be displayed on at least one area of the currently displayed user interface, based on the received screen display information. For example, the processor 180 may control the user interface to be displayed on one area of a call establishment screen, based on the received data.

According to an embodiment of this invention, while a call is performed with another electronic device (e.g., the electronic device 200), the processor 180 may receive data from another electronic device (e.g., the electronic device 200) through the communication unit 130, based on the internet protocol. Based on the received data, the processor 180 may control the memory 140 to store commands for controlling a user interface, provided from another electronic device (e.g., the electronic device 200), to be displayed on at least one area of the screen.

According to an embodiment, the processor 180 may receive data associated with status information of another electronic device (e.g., the electronic device 200) from another electronic device (e.g., the electronic device 200) through the communication unit 130.

According to an embodiment, the processor 180 may receive, another electronic device (e.g., the electronic device 200), data packet that contains an internet address associated with another electronic device (e.g., the electronic device 200) and a value indicating another electronic device (e.g., the electronic device 200). For example, a header of the received data packet may contain a value (e.g., a phone number of another electronic device (e.g., the electronic device 200), etc) that indicates another electronic device (e.g., the electronic device 200).

According to an embodiment, when displaying a user interface, the processor 180 may distinguish the first area for displaying information associated with a call connection with another electronic device (e.g., the electronic device 200) from the second area displayed on the basis of data received from another electronic device (e.g., the electronic device 200). For example, the first area may be a fixed area disallowing a scroll function, and the second area may be a variable and scrollable area depending on a user's selection. In another example, when a user input is detected, the processor 180 may control a user interface (e.g., an image item, a thumbnail image, a shortcut icon, etc.) to be displayed on one variable area from among display areas of a call establishment screen, a call request screen or a call response screen.

According to an embodiment of this invention, the processor 180 may control a video call to be performed with another electronic device (e.g., the electronic device 200) through the communication unit 130. For example, the electronic device 100 may transmit a signal requesting a video call to another electronic device (e.g., the electronic device 200) and perform a video call with another electronic device (e.g., an electronic device 200) by receiving a response signal from another electronic device (e.g., the electronic device 200).

According to an embodiment, while a video call is performed, the processor 180 may control an image corresponding to the electronic device 100 and an image corresponding to another electronic device (e.g., the electronic device 200) to be displayed on one area of a screen. The image corresponding to the electronic device 100 may be greater in size than the image corresponding to another electronic device (e.g., the electronic device 200).

According to an embodiment, the processor 180 may control a user interface offering a previously stored function to be displayed on one area of a screen. The user interface may be overlaid or blurred on the displayed image. When an input event (e.g., a command event for indicating a separate item) is detected on the displayed user interface, the processor 180 may control, using a session initiation protocol (SIP), data corresponding to the detected input event to be transmitted to another electronic device (e.g., the electronic device 200). The session initiation protocol may be a structure for controlling an application-layer signaling protocol, the creation of a multimedia service session such as an internet-based conference, and the like.

The bus 190 may be a circuit that interconnects the above-discussed elements and delivers communication (e.g., a control message) between such elements.

Figure 2A:
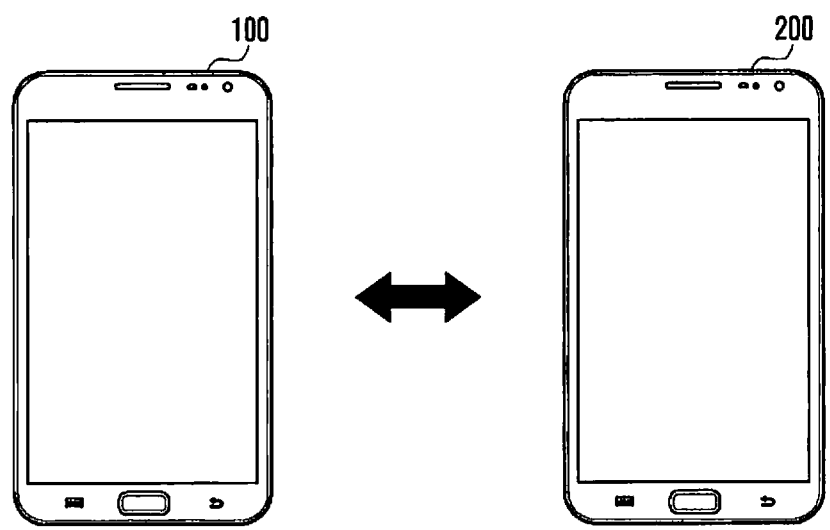
FIGS. 2A to 2C schematically illustrate transmission/reception of screen display information between electronic devices according to an embodiment.
Figure 2B:
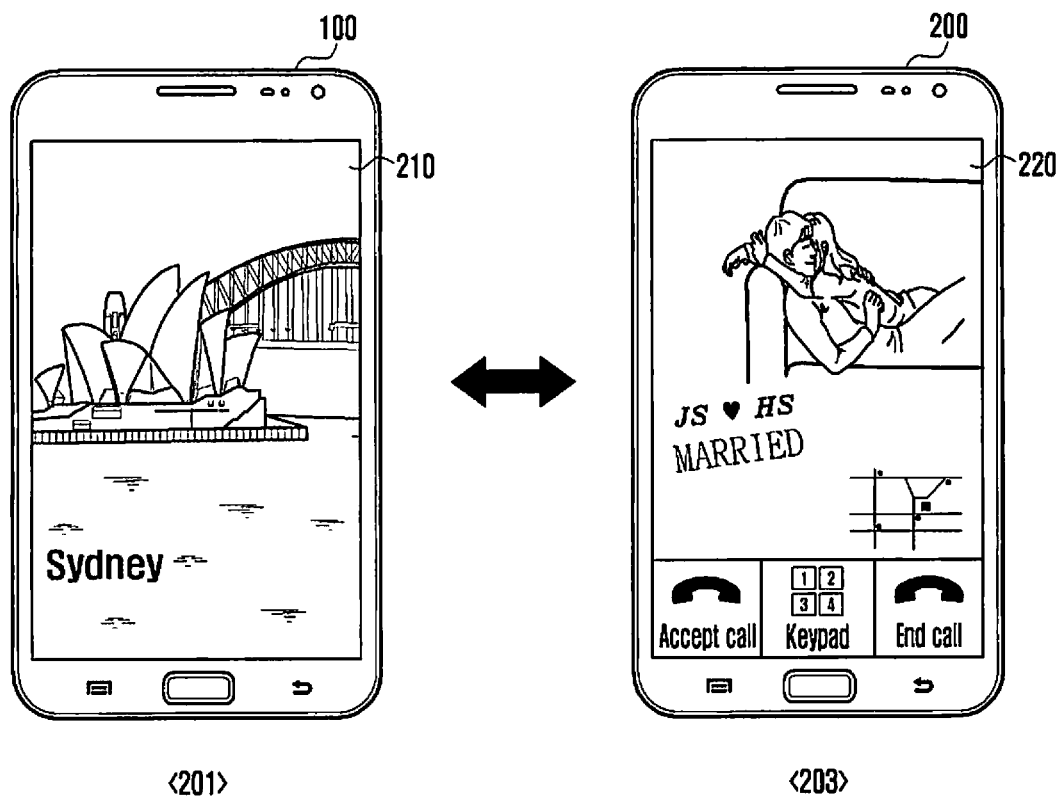
Figure 2C:
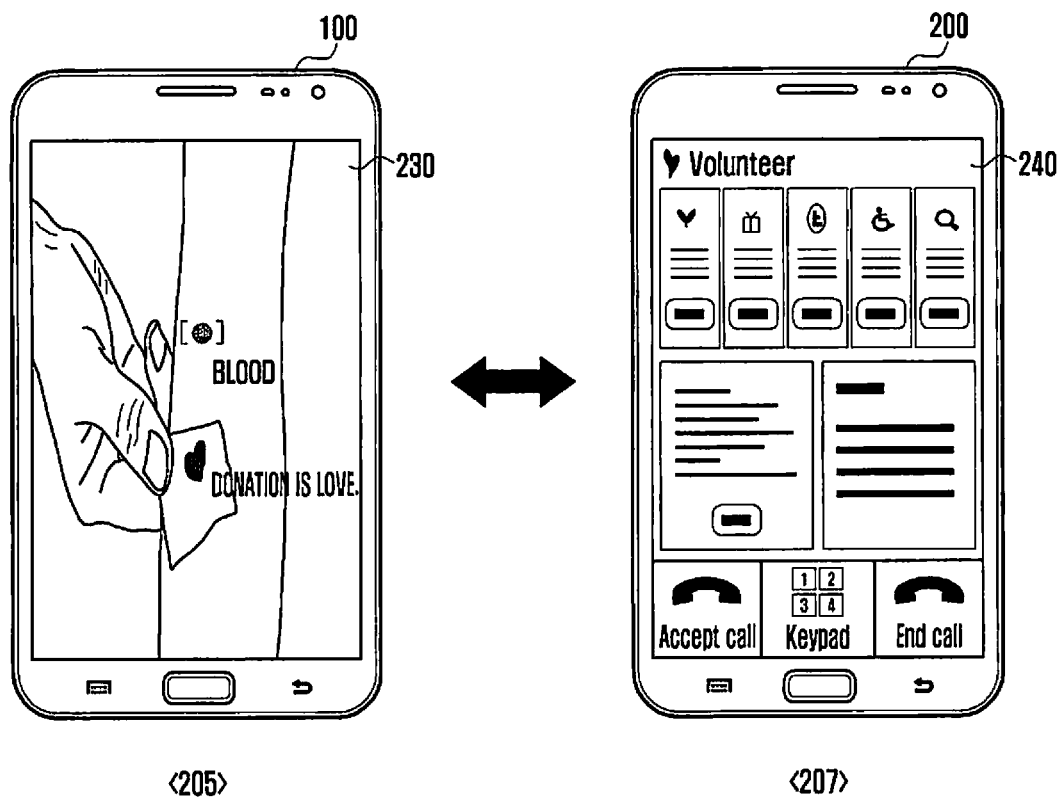

FIGS. 2A to 2C schematically illustrate transmission/reception of screen display information between the electronic devices 100 and 200 according to an embodiment. Herein, the electronic device 100 is referred to as the first electronic device 100, and the electronic device 200 is referred to as the second electronic device 200.

Referring to FIG. 2A, the first electronic device 100 may control a user interface to be displayed, based on screen display information received from the second electronic device 200. The second electronic device 200 may control a user interface to be displayed, based on screen display information received from the first electronic device 100.

At 201 of FIG. 2B, the first electronic device 100 may transmit a call request signal to the second electronic device 200. According to an embodiment, the first electronic device 100 may receive screen display information from the second electronic device 200. The screen display information received from the second electronic device 200 may be information created on the basis of the call request signal of the first electronic device 100. According to an embodiment, the first electronic device 100 may display a user interface 210 on a call request screen, based on the screen display information received from the second electronic device 200. Herein, the user interface 210 may contain an image for offering information predefined by the second electronic device 200.

For example, the second electronic device 200 may store, in the memory thereof, screen display information corresponding to each of a plurality of electronic devices. When the call request signal is received from the first electronic device 100, the second electronic device 200 may determine the screen display information corresponding to user information of the first electronic device 100. For example, the second electronic device 100 may select, as the screen display information corresponding to the first electronic device 100, an image indicative of a business trip or an overseas travel.

At 203 of FIG. 2B, the second electronic device 200 may receive the call request signal from the first electronic device 100. The second electronic device 200 may receive screen display information from the first electronic device 100. For example, the second electronic device 200 may control a user interface 220 to be displayed on a call response screen, based on screen display information contained in the call request signal received from the first electronic device 100. In another example, before the call request signal is received from the first electronic device 100, the second electronic device 200 may control the user interface 200 to be displayed, based on screen display information which corresponds to the first electronic device 100 and is previously stored in the memory of the second electronic device 200.

According to an embodiment, the second electronic device 200 may display the user interface 220 that offers marriage information on the call response screen, based on screen display information contained in the signal received from the first electronic device 100.

At 205 of FIG. 2C, the first electronic device 100 may transmit the call request signal to the second electronic device 200. The first electronic device 100 may receive screen display information from the second electronic device 200. The screen display information received from the second electronic device 200 may be information created on the basis of the signal requested by the first electronic device 100. According to an embodiment, the first electronic device 100 may display a user interface 230 on a call connection screen, based on the screen display information received from the second electronic device 200. The user interface 230 may contain information, predetermined by the second electronic device 200, or an image for offering such information.

According to an embodiment, the second electronic device 200 may store, in the memory thereof, screen display information corresponding to each of a plurality of electronic devices. When the call request signal is received from the first electronic device 100, the second electronic device 200 may determine screen display information corresponding to user information of the first electronic device 100. In a further example, when the call request signal is received from the first electronic device 100, the second electronic device 200 may previously store, in the memory thereof, the user interface 230 for offering blood donation information. When the call request signal is received from the first electronic device 100, the second electronic device 200 may transmit, to the first electronic device 100, the user interface 230 containing blood donation information.

At 207 of FIG. 2C, the second electronic device 200 may receive the call request signal from the first electronic device 100. The second electronic device 200 may receive the screen display information from the first electronic device 100. For example, the second electronic device 200 may control a user interface 240 to be displayed on a call response screen, based on the screen display information contained in the call request signal received from the first electronic device 100. In another example, before the call request signal is received from the first electronic device 100, the second electronic device 200 may control the user interface 240 to be displayed, based on screen display information which corresponds to the first electronic device 100 and is previously stored in the memory.

For example, the second electronic device 200 may display the user interface 240 that contains volunteer information, based on screen display information contained in the signal received from the first electronic device 100.

Figure 4:
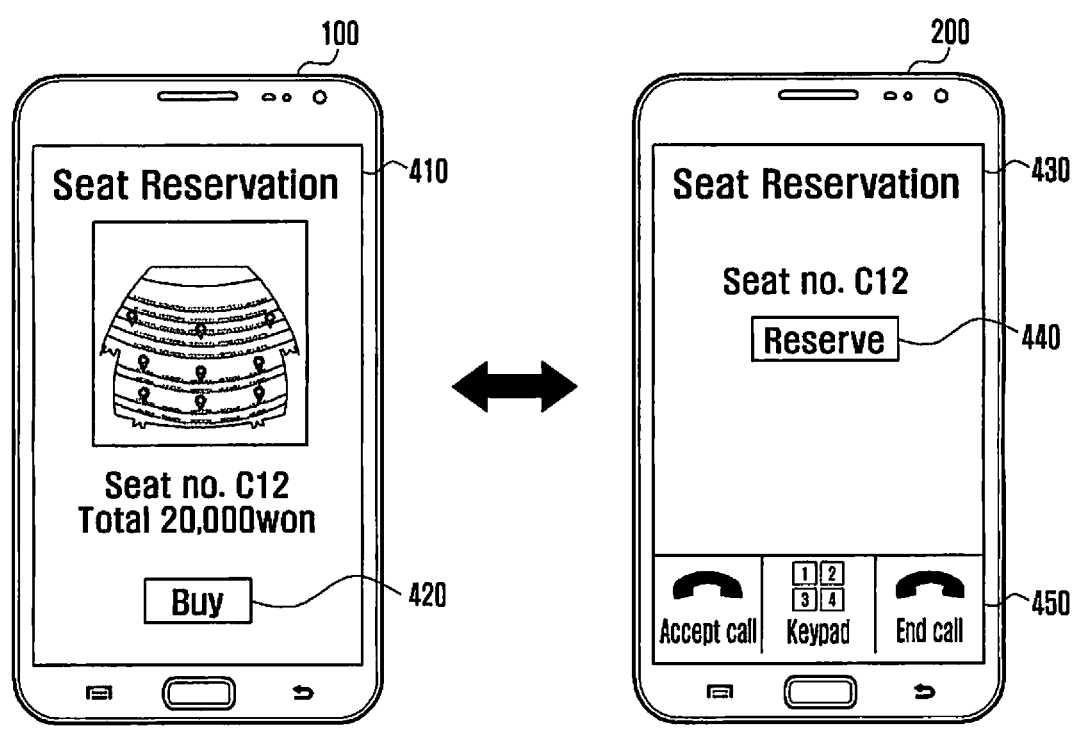

FIG. 3 and FIG. 4 schematically illustrate transmission/reception of screen display information between the electronic devices 100 and 200 according to an embodiment. Herein, the electronic device 100 is referred to as the first electronic device 100, and the electronic device 200 is referred to as the second electronic device 200.

Referring to 301 of FIG. 3, the first electronic device 100 may transmit a call request signal to the second electronic device 200 according an embodiment of this invention. The first electronic device 100 may receive screen display information from the second electronic device 200. The screen display information received from the second electronic device 200 may be information created on the basis of the call request signal of the first electronic device 100.

According to an embodiment, the first electronic device 100 may display a user interface 310 on a call connection screen, based on the screen display information received from the second electronic device 200. The user interface 310 may contain information, predetermined by the second electronic device 200, or an image for offering such information. For example, the user interface 310 received from the second electronic device 200 may contain text information including survey information.

According to an embodiment, the user interface 310 may contain a selection item 320 for selecting the rating of a specific medium and a command item 330 for transmitting information to the second electronic device 200. For example, detecting an input event of selecting a rating of three stars on the selection item 320 and then selecting the command item 330, the processor 180 may control transmission of data corresponding to the rating of three stars to the second electronic device 200.

At a reference numeral 303, when the call request signal or data corresponding to the selection item 320 and the command item 330 is received from the first electronic device 100, the second electronic device 200 may identify group information that includes user information corresponding to the first electronic device 100. Based on the identified group information, the second electronic device 200 may display data corresponding to the selection item 320 and the command item 330 on a group message user interface 340. The group message user interface 340 may contain group information 341 including user information corresponding to the first electronic device 100, a data history 343, and an input message user interface 345.

The group information 341 may be user information (e.g., Gillian, Jacobs, Kamilla, Carlos, John, etc.) of another electronic devices including the first electronic device 100. The data history 343 may be a window for arranging and displaying sequentially, in time-based order, data received from external electronic devices, including the first electronic device 100, which correspond to the user information contained in the group information 341. The input message user interface 345 may be an input window for entering text data, audio data, or video data.

For example, if data, point 5.0, is received from the first electronic device 100, the second electronic device 200 may display, on the data history 343, text "point is 5.0" together with a thumbnail image corresponding to the first electronic device 100. For example, if data is received from external devices contained in a predetermined group together with the first electronic device 100, the second electronic device 200 may arrange and display the received data on the data history 343 in time-based sequential order.

According to an embodiment, after transmitting data corresponding to the selection item 320 and the command item 330 to the second electronic device 200, the first electronic device 100 may change the displayed user interface 310 to the group message user interface 340. For example, the first electronic device 100 may receive, from the second electronic device 200, screen display information required for displaying the group message user interface 340. Based on the screen display information received from the second electronic device 200, the first electronic device 100 may display the group message user interface 340.

Referring to FIG. 4, the first electronic device 100 may transmit a call request signal to the second electronic device 200 according to an embodiment of this invention. The first electronic device 100 may receive screen display information from the second electronic device 200. The screen display information received from the second electronic device 200 may be information created on the basis of the call request signal of the first electronic device 100.

According to an embodiment, the first electronic device 100 may display a user interface 410 on a call connection screen, based on the screen display information received from the second electronic device 200. The user interface

410 may contain an image item (e.g., a thumbnail image, a shortcut icon, etc.) or text information for offering information predetermined by the second electronic device 200.

According to an embodiment, the user interface 410 received from the second electronic device 200 by the first electronic device 100 may contain an image item for offering seat reservation information. This seat reservation information may include price information, available seat information, and the like. For example, when an input on the seat reservation user interface 410 (e.g., an input for selecting a seat from among a plurality of seats in a theater, a performance, etc.) displayed on the call connection screen is detected, the first electronic device 100 may display a user interface corresponding to the detected input (e.g., an image item indicating the position of the selected seat, a position number of the seat, price information corresponding to the selected seat, etc.). The image item indicating the position of the selected seat may be distinctively displayed by means of color, brightness, etc. in comparison with unselected areas.

According to an embodiment, the first electronic device 100 may detect an input on a command item 420. The first electronic device 100 may transmit data corresponding to the detected input to the second electronic device 200. For example, when detecting an input on the command item 420, the first electronic device 410 may send position data, price data, etc. of the selected seat to the second electronic device 200 through the seat reservation user interface 410. Referring to FIG. 4, the first electronic device 100 may send data corresponding to the seat number C12 and the total price 20,000 won to the second electronic device 200.

According to an embodiment of this invention, the second electronic device 200 may receive data corresponding to the command item 420 from the first electronic device 100. For example, the second electronic device 200 may receive data of the selected seat, total price data, etc. from the first electronic device 100. According to another embodiment, in case of price data paid by the first electronic device 100, the second electronic device 200 may receive this from an external server for payment (e.g., a payment server, a payment terminal, etc.).

According to an embodiment, the second electronic device 200 may display a user interface 430 on a call response screen, based on the received data, or display the user interface 430 after receiving data corresponding to the command item 420.

According to an embodiment, the user interface 430 may contain an image item 450 for replying to a call request and an additional image item 440 for sending the received data to an external reservation server. When an input on the additional image item 440 is detected, the second electronic device 200 may transmit data to the external reservation server or store the received data in an internal memory so as to add the received data to a reservation list in time-based order.

Figure 5:
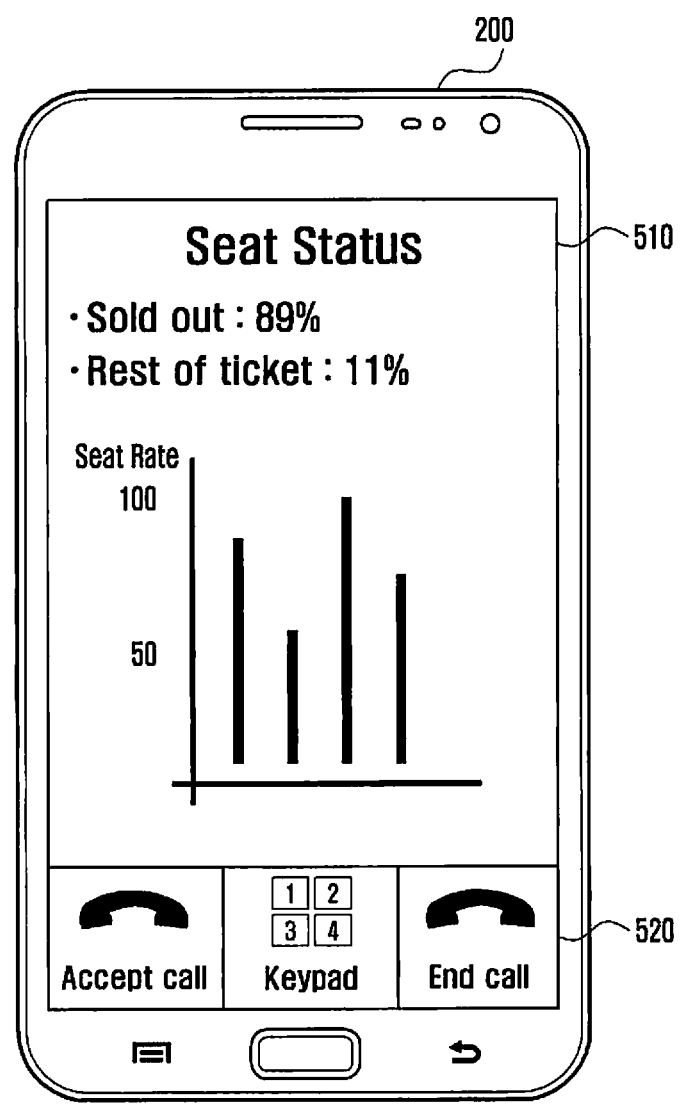
FIG. 5 schematically illustrates an exemplary utilization of data received at an electronic device according to an embodiment.

FIG. 5 schematically illustrates an exemplary utilization of data received at the electronic device 200 according to an embodiment.

Referring to FIG. 5, the second electronic device 200 may display, on a call response screen, a user interface 510 and an image item 520 associated with a call according to an embodiment. The second electronic device 200 may display statistics associated with data received from the first electronic device 100 on the user interface 510. For example, when reservation data (e.g., seat reservation data, price payment data, etc.) is received from the first electronic device 100, the second electronic device 200 may display statistics of sold-out data, available seat data, reserved ratio data of each seat row, etc. on the user interface 510. Such statistics may be displayed in the form of a bar graph, a chart, etc. on the user interface 510.

Figure 6:
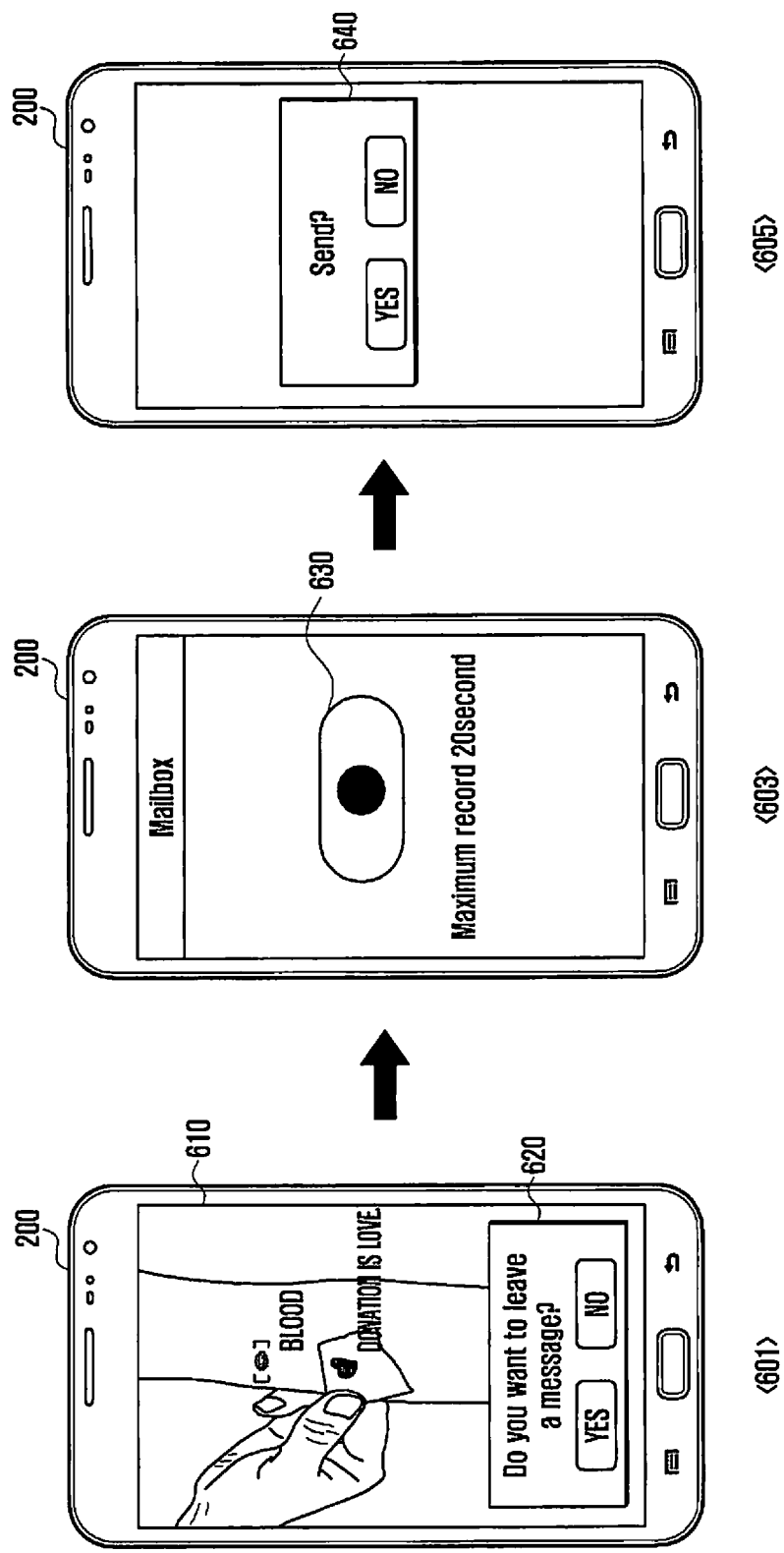
FIG. 6 illustrates an example of creating a message in case of a failure in call between electronic devices according to an embodiment.

FIG. 6 illustrates an example of creating a message in case of a failure in a call between the electronic devices 100 and 200 according to an embodiment. Herein, the electronic device 100 is referred to as the first electronic device 100, and the electronic device 200 is referred to as the second electronic device 200.

At a reference numeral 601, when a call request signal is received from the first electronic device 100, the second electronic device 200 may display a user interface 610 on a call response screen, based on received screen display information. The second electronic device 200 may detect an input for indicating a call-disabled state on a message item 620 in response to the call request signal received from the first electronic device 100.

According to an embodiment, the second electronic device 200 may create text message data or audio message data, based on a stored input, and then send the created text or audio message data to the first electronic device 100.

At a reference numeral 603, the second electronic device 200 may change the displayed user interface 610 to an audio user interface 630. Referring to 605, the second electronic device 200 may create audio message data through an input on the displayed audio user interface 630 and transmit the created audio message data to the first electronic device 100.

For example, after controlling the transmission of a call-disabled signal to the first electronic device 100, the second electronic device 200 may control a text user interface or an audio user interface to be displayed on the screen.

Figure 7:
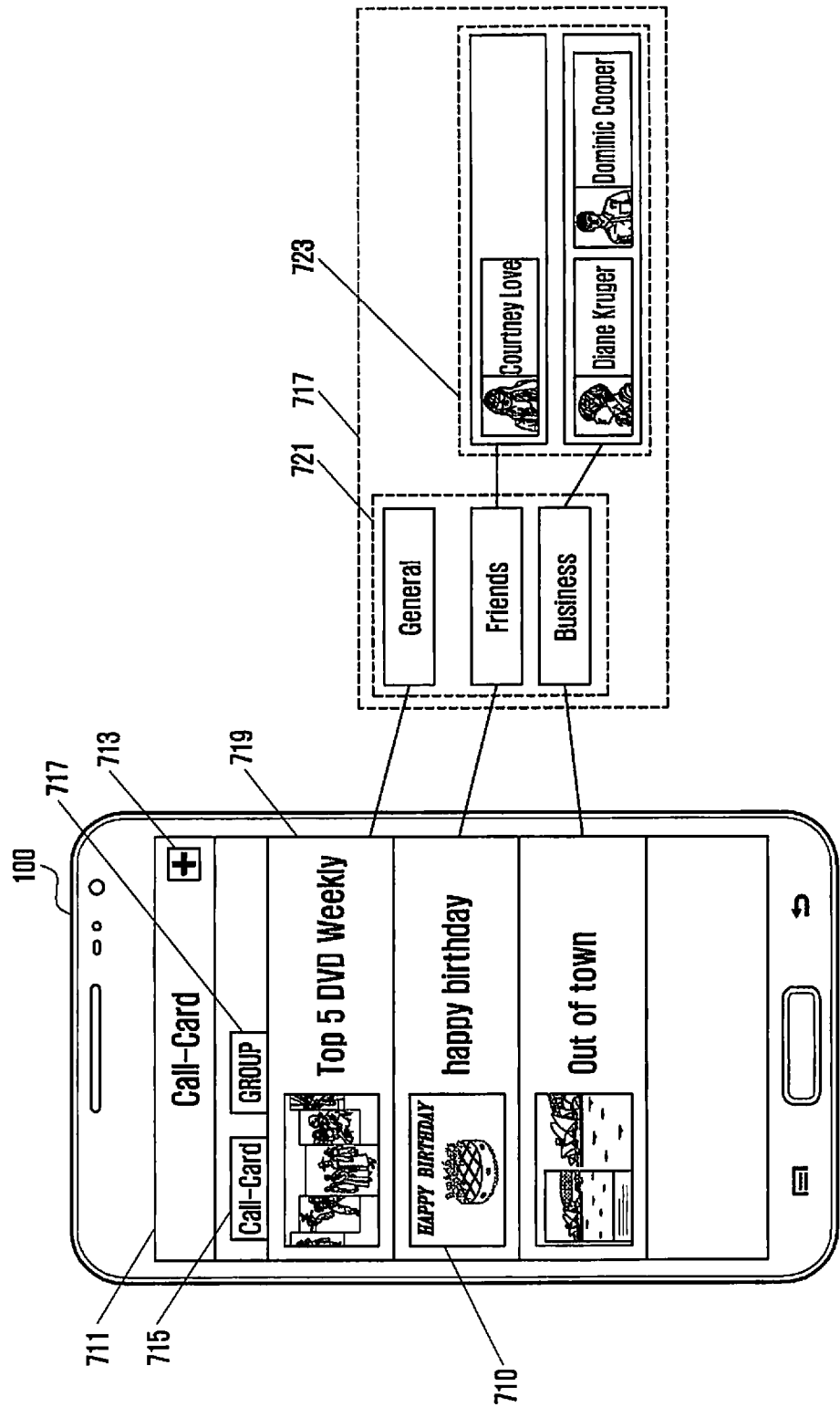
FIG. 7 illustrates an example of a user interface according to an embodiment.

FIG. 7 illustrates an example of a user interface according to an embodiment.

The electronic devices 100 and 200 may create a user interface. the user interface 719 may contain an image item 710, a title item 711, an add button item 713, a call-card group item 715, and a group item 717.

The title item 711 may indicate the name of the user interface 719. For example, the name of the user interface 719 may be a call-card. The add button item 713 may be a shortcut for adding a new item to the user interface 719. For example, when an input on the add button item 713 is detected, the electronic devices 100 and 200 may display an additional window for adding the image item 710 or an application for adding a downloadable URL.

The call-card group item 715 may contain the image items 710 and text corresponding to the image items 710 which are stored in the electronic devices 100 and 200. The group item 717 may contain each of the image item 710 and user information corresponding to each of the image item 710. The group item 717 may contain group information 721 and user information 723 corresponding to the group information 721.

In an example shown in FIG. 7, "Courtney Love" denotes user information stored corresponding to "Friends", and "Diane Kruger" and "Dominic Cooper" denote user information stored corresponding to "Business". If a call request signal is received from an electronic device corresponding to Courtney Love, the electronic device 200 may identify that the group information 721 corresponding to Courtney Love is Friends, and then determine screen display information that includes the image item 710 and related text denoting a "happy birthday" corresponding to Friends. The electronic device 200 may send the determined screen display information to the electronic device corresponding to Courtney Love.

Figure 8:
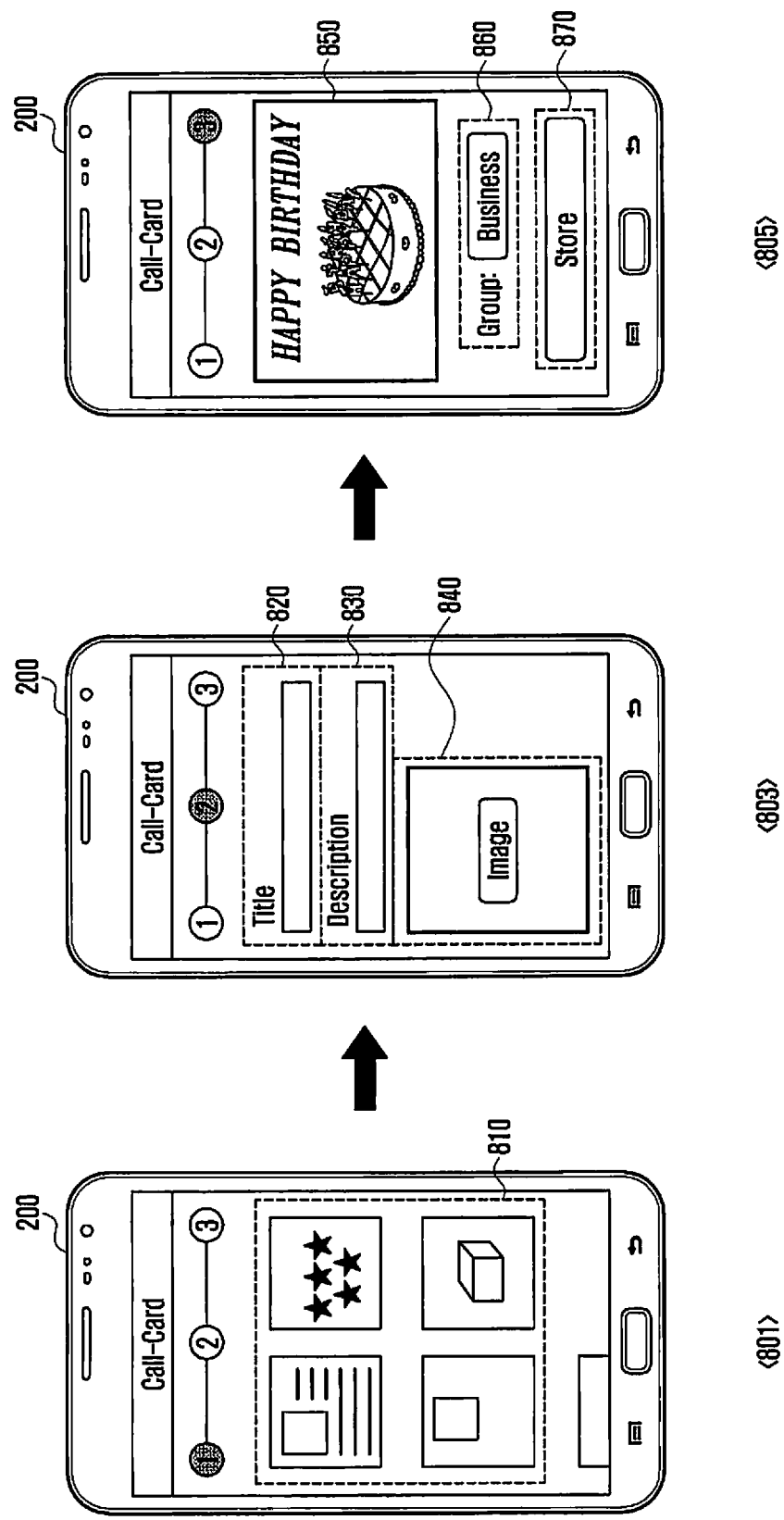
FIG. 8 illustrates an example of creating a user interface of an electronic device according to an embodiment.

FIG. 8 illustrates an example of creating a user interface of the electronic device 200 according to an embodiment.

The electronic device 200 may create a user interface. At a reference numeral 801, the electronic device 200 may display a template 810 of the user interface. The template 810 may be previously stored or received from an external electronic device or server. At a reference numeral 803, the electronic device 200 may display a title 820, a description 830, an image item 840 corresponding to the template 810, and store inputs regarding the title 820, the description 830, and the image item 840. The image item 840 may be previously stored or downloaded from an external electronic device or server.

At a reference numeral 805, when the image item 840 is selected, a corresponding image may be displayed as a preview image item 850. Group information 860 may be used to determine a group to display a user interface that contains the preview image item 850, the title 820, the description 830, and the like. For example, the group information 860 may be determined as a business and stored. When an input on a store item 870 is detected, the electronic device 200 may store a user interface including the input title 820, the description 830, and the like. According to an embodiment, the stored user interface may be converted to HTML form and stored or stored in a compressed form.

Figure 9:
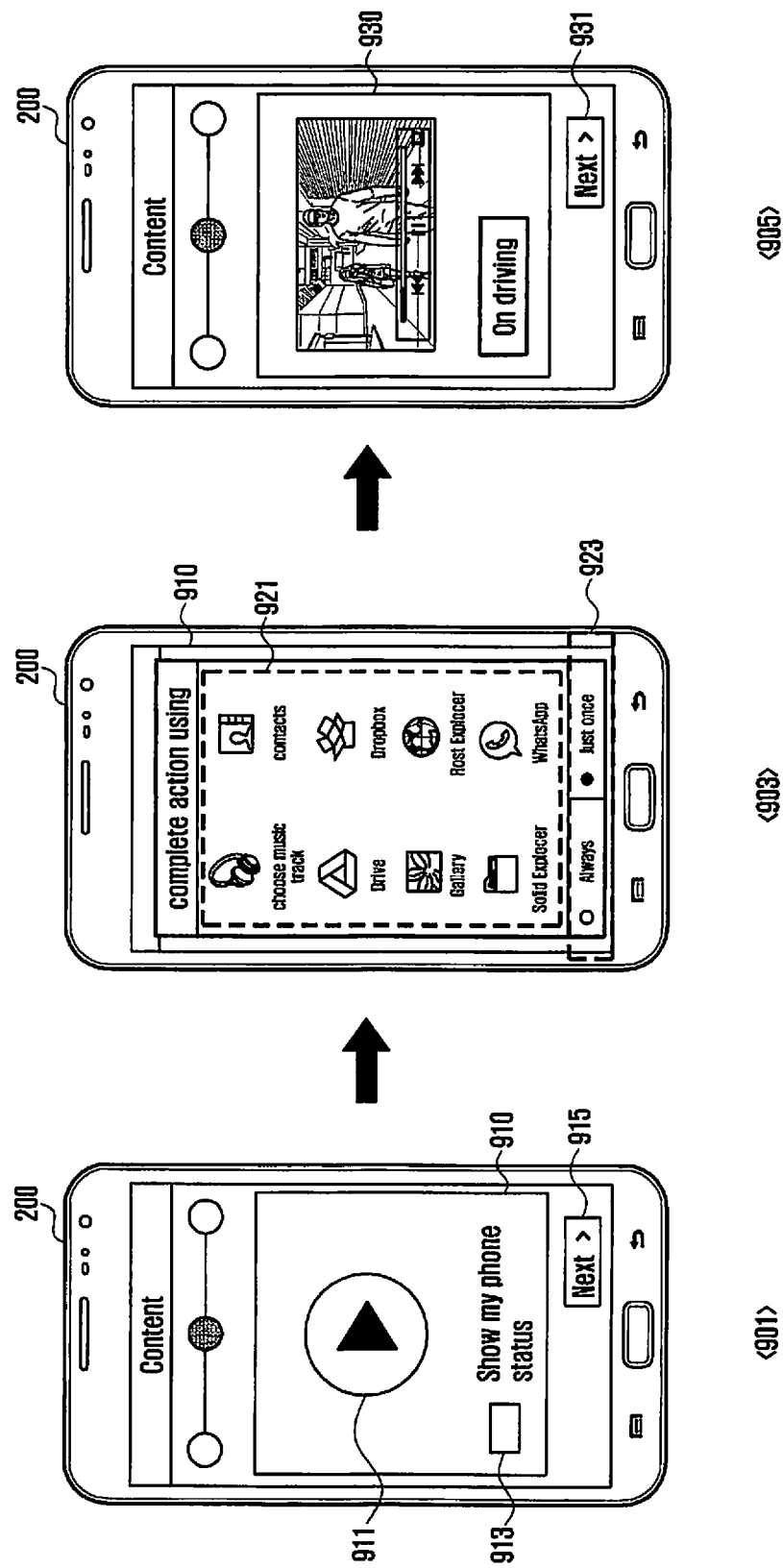
FIG. 9 illustrates an example of creating a user interface of an electronic device according to an embodiment.

FIG. 9 illustrates an example of creating a user interface of the electronic device 200 according to an embodiment.

The electronic device 200 may create a user interface. At a reference numeral 901, the electronic device 200 may display a template 910 of the user interface. The template 910 may be previously stored in memory 140, downloaded from an external electronic device (e.g., another electronic device (e.g., the electronic device 100)), or received from a server. The template 910 may contain a recording item 911, a status selection item 913, and a next step item 915.

The recording item 911 may be a thumbnail image corresponding to performing a function of recording audio data, video data or moving picture data. For example, after an input on the recording item 911 is detected, the electronic device 200 may control the audio data, the video data, or the moving picture data received from the outside to be recorded. In a further additional example, when an input on the recording item 911 is detected, the electronic device 200 may activate a camera module equipped therein and receive audio information, video information, or moving picture information. The electronic device 200 may store the received audio information, video information, or moving picture information in the memory 140.

The status selection item 913 is an image item associated with a function of offering status information of the electronic device 200 to another electronic device (e.g., the electronic device 100) during a try for a call connection with or during a call connection with another electronic device (e.g., the electronic device 100). For example, in case of selecting the status selection item 913 (e.g., checking an empty square image item), the electronic device 200 may control the status information of the electronic device 200 to be transmitted to another electronic device (e.g., the electronic device 100) during a try for a call connection with or during a call with another electronic device (e.g., the electronic device 100). The status information of the electronic device 200 may include silent mode setting information, drive mode setting information, battery charging state information, Bluetooth information, earphone connection information, etc. of the electronic device 200.

When an input event is detected on the next step item 915, the electronic device 200 may switch to a screen of a reference numeral 903 or control a user interface for offering an additional function to be displayed.

At a reference numeral 903, the electronic device 200 may display a user interface 920. The user interface 920 may contain a multimedia item 921 and an activation selection item 923. The multimedia item 921 may include a choose music track, a drive, a gallery, a solid explorer, contacts, a drop box, a root explorer, and a whats app image item.

Through the multimedia item 921, the electronic device 200 may select status information (e.g., a silent mode or not, a drive mode or not, a battery charging state, a Bluetooth mode or not, an earphone connected or not, etc.) of the electronic device 200 to be offered to another electronic device (e.g., the electronic device 100). Alternatively, the multimedia item 921, the electronic device 200 may select one of previously stored video data.

The activation selection item 923 may be a selection image item corresponding to a function of always offering or offering only once the status information of the electronic device 200 to another electronic device (e.g., the electronic device 100). For example, when a selection image item (e.g., always image item) for always offering the status information of the electronic device 200 is selected, text that includes status information of the electronic device 200 may be always displayed on at least one area of the screen of another electronic device (e.g., the electronic device 200) with which a call connection is tried or performed.

At a reference numeral 905, the electronic device 200 may display a preview image item 930. The preview image item 930 may include text for offering status information of the electronic device 200. For example, the electronic device 200 may display text, on-driving. This status information, on-driving, of the electronic device 200 may be status information selected by the second electronic device 200. The preview image item 930 may include video data. For example, when creating a user interface, the electronic device 200 may create video data selected from among video data recorded through the recording item 911 or previously stored, to be displayed together with text for indicating the status information of the electronic device 200. In a further example, during a try for a call connection or after establishment of a call connection, another electronic device (e.g., the electronic device 100) may display, on at least one area of the screen, a user interface that contains video data received from the electronic device 200 and text for indicating status information of the electronic device 200.

Figure 10:
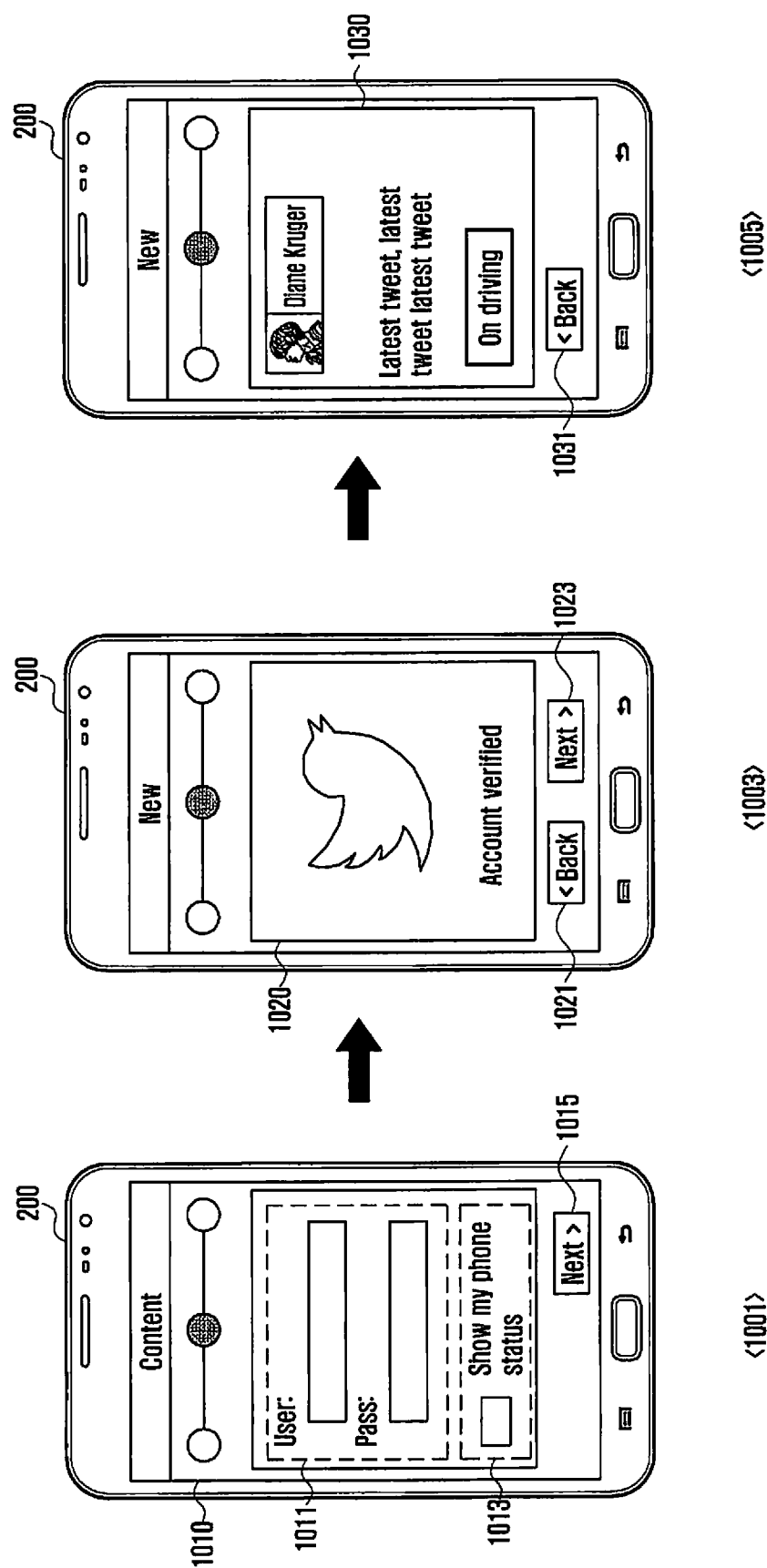
FIG. 10 illustrates an example of creating a user interface of an electronic device according to an embodiment.

FIG. 10 illustrates an example of creating a user interface of the electronic device 200 according to an embodiment.

The electronic device 200 may create a user interface. At a reference numeral 1001, the electronic device 200 may display a template 1010 of the user interface. The template 1010 may be previously stored, downloaded from an external electronic device, or received from a server. The template 1010 may include an identification (ID) item 1011 and a status selection item 1013.

The ID item 1011 may include an ID and a password for a social network service (SNS). The status selection item 913 may be an image item about whether to offer status information of the electronic device 200 to another electronic device (e.g., the electronic device 100) during a try for a call connection or during a call connection with another electronic device (e.g., the electronic device 100). For example, when the status selection item 1013 is selected (e.g., checking an empty square image item), the electronic device 200 may control the status information of the electronic device 200 to be transmitted during a try for a call connection or during a call connection with another electronic device (e.g., the electronic device 100).

When an input event is detected on a next step item 1015, the electronic device 200 may switch to a screen of a reference numeral 1003 or control a user interface for offering an additional function to be displayed.

At a reference numeral 1003, the electronic device 200 may receive a result of comparison between an ID and password entered through the ID item 1011 and an ID and password stored in an SNS server. The electronic device 200 may display a result screen item 1020, based on the comparison result received from the SNS server. For example, if the comparison result is positive, the electronic device 200 may control a user interface for indicating verification (e.g., account verified) to be displayed through the result screen item 1020.

The electronic device 200 may switch to a screen of a reference numeral 1001 in response to an input on a previous image item 1021 and switch to a screen of a reference numeral 1005 in response to an input on a next image item 1023.

At a reference numeral 1005, the electronic device 200 may display a preview image item 1030. The preview image item 1030 may contain text for offering status information of the electronic device 200. For example, the electronic device 200 may display text, on-driving. The preview image item 930 may include SNS information. The preview image item 930 may include, as SNS information, text called latest tweet, latest tweet latest tweet created by Diane Kruger.

Figure 11B:
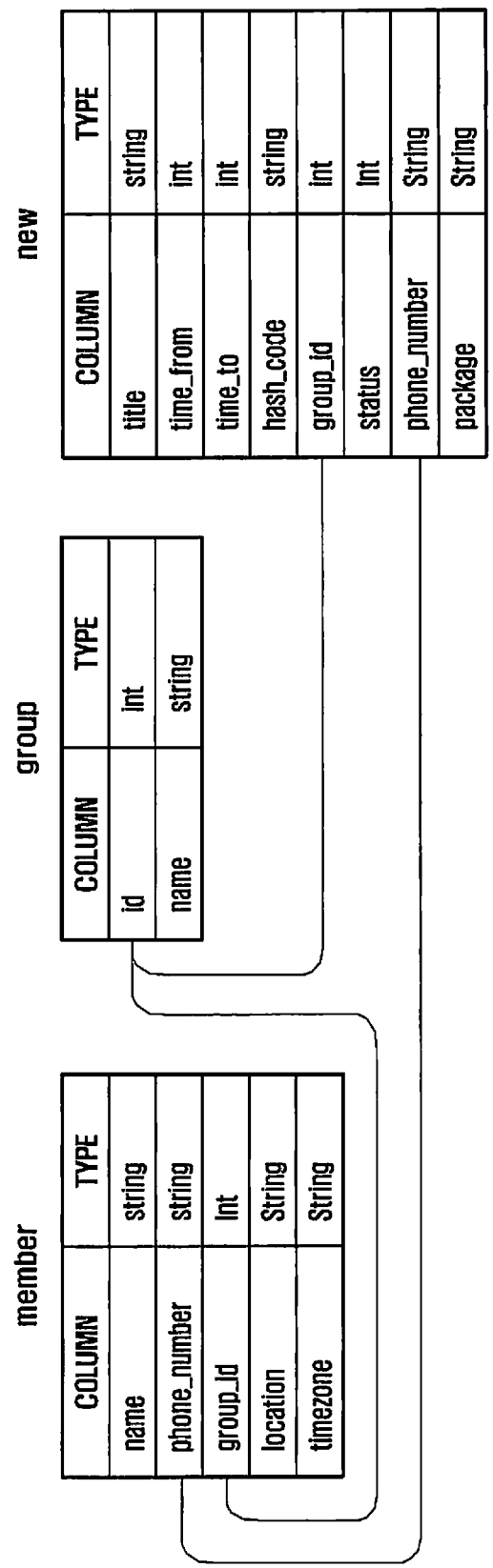

For example, when creating a user interface, the electronic device 200 may create a user interface to offer SNS information together with text including status information of the electronic device 200 during a try for a call connection or during a call connection with another electronic device (e.g., the electronic device 100). In a further example, during a try for a call connection or during a call connection, another electronic device (e.g., the electronic device 100) may display, on one area of a screen, a user interface that contains SNS data received from the electronic device 200 and text including status information of the electronic device 200. FIGS. 11A and 11B illustrate an example of a data structure regarding a user interface according to an embodiment The screen display information transmitted and received between the electronic devices 100 and 200 may be stored in metadata, depending on a data structure. For example, referring to 1101 of FIG. 11A, a call request signal, screen display information, data, etc. may contain a data transmission/reception time, a hash code, and the like. For example, referring to 1103 of FIG. 11A, screen display information and a user interface may be transmitted and received in the form of HTML5. Here, the HTML 5 form may have css, js forms in the data structure.

Referring to FIG. 11B, the electronic device 100 or 200 may include a data structure regarding a member, group information, and a call-card (new). The member may include a name, a phone number, a group ID, a location, and a time zone. The group information may include an ID and a name. The call-card (new) may include a title, a start time (time_from), an end time (time_to), a hash code, a group ID, a status, a phone number, and a package. Each data structure may have a type of string for denoting text or a type of int for denoting integer.

FIG. 12 illustrates a flow diagram for displaying content of the electronic devices 100 and 200 according to an embodiment.

At operation 1201, the first electronic device 100 transmits a call request signal to the second electronic device 200. At operation 1203, the second electronic device 200 determines screen display information, based on the received signal. For example, the second electronic device 200 may identify user information corresponding to the first electronic device 100 and then determine screen display information corresponding to group information contained in the identified user information.

At operation 1205, the second electronic device 200 transmits the determined screen display information to the first electronic device 100. For example, the determined screen display information may be in HTML or compressed form. At operation 1207, the first electronic device 100 displays a user interface, based on the screen display information. The user interface may contain an image item, a thumbnail image, text data, and the like for offering information.

According to an embodiment, the user interface may be divided into the first area which displays a fixed UI, and the second area which varies depending on another electronic device. In case of the second area, displayed information may be variously changed depending on a user's selection. For example, the second area may be scrollable in response to a user's selection or gesture. Through this, the electronic devices 100 and 200 may display various kinds of information within a limited screen.

Figure 13:
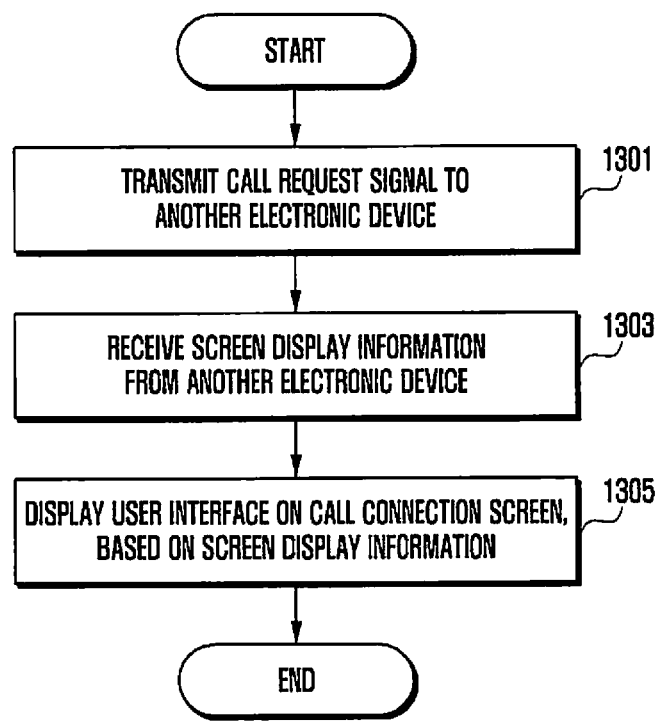
FIG. 13 illustrates a flow diagram for displaying content of an electronic device according to an embodiment.

FIG. 13 illustrates a flow diagram for displaying content of the electronic devices 100 and 200 according to an embodiment.

At operation 1301, the electronic device 100 transmits a call request signal to another electronic device (e.g., the electronic device 200). The call request signal may contain ID information for identifying the electronic device 100, storage information stored in one area of the memory of the electronic device 100, a hash code created using user interface creation information, and the like.

At operation 1303, the electronic device 100 receives screen display information from another electronic device (e.g., the electronic device 200). For example, the screen display information received from another electronic device (e.g., the electronic device 200) may has a compressed form or an HTML form. If the screen display information has a compressed form, the electronic device 100 may decompress and then determine the screen display information.

At operation 1305, the electronic device 100 controls a user interface to be displayed on a call connection screen, based on the received screen display information. The user interface may contain image data or text data which has additional information.

Figure 14:
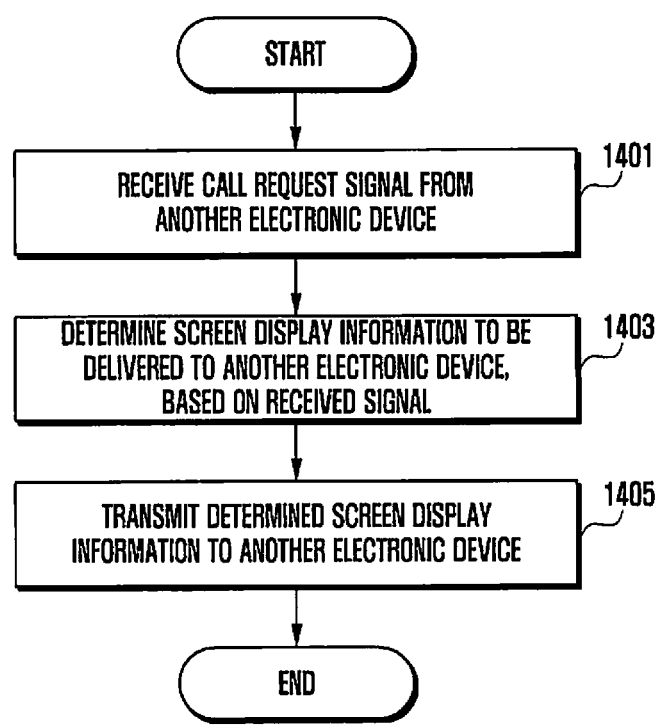
FIG. 14 illustrates a flow diagram for displaying content of an electronic device according to an embodiment.

FIG. 14 illustrates a flow diagram for displaying content of the electronic device 200 according to an embodiment.

At operation 1401, the electronic device 200 receives a call request signal from another electronic device (e.g., the electronic device 100). At operation 1403, the electronic device 200 determines screen display information to be delivered to another electronic device (e.g., the electronic device 100), based on the received signal. For example, the electronic device 200 may identify user information contained in a call request signal received from another electronic device (e.g., the electronic device 100), and then determine screen display information corresponding to the identified user information.

At operation 1405, the electronic device 100 transmits the determined screen display information to another electronic device (e.g., the electronic device 200). The screen display information may have a compressed form or an HTML form.

Figure 15:
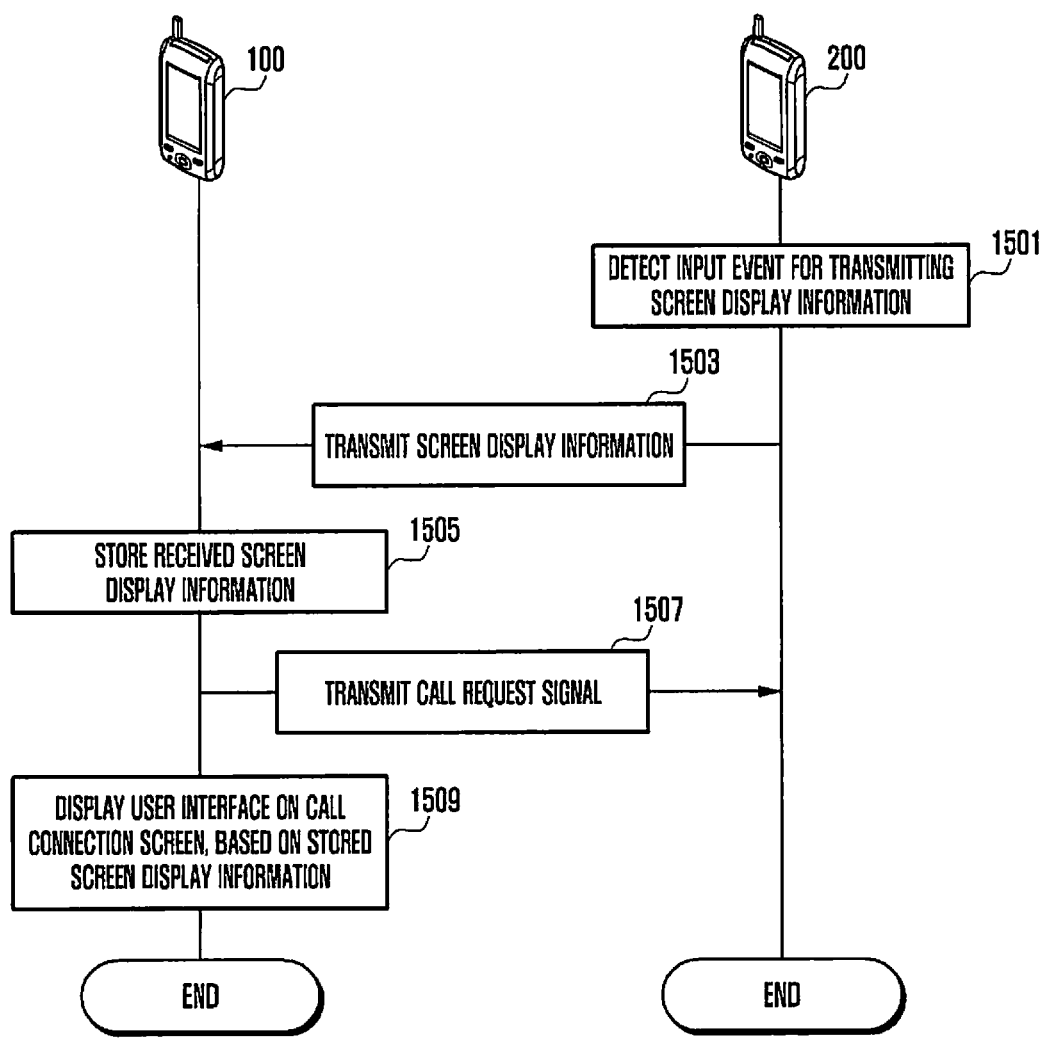
FIG. 15 illustrates a flow diagram for transmitting and receiving content between electronic devices according to an embodiment.

FIG. 15 illustrates a flow diagram for transmitting and receiving content between the electronic devices 100 and 200 according to an embodiment. Herein, the electronic device 100 is referred to as the first electronic device 100, and the electronic device 200 is referred to as the second electronic device 200.

At operation 1501, the second electronic device 200 detects an input event for transmitting screen display information. At operation 1503, the second electronic device 200 transmits the screen display information. At operation 1505, the first electronic device 100 stores the received screen display information in the memory 140. At operation 1507, the first electronic device 100 transmits a call request signal. At operation 1509, the first electronic device 100 displays a user interface on a call connection screen, based on the screen display information stored in the memory 140.

According to an embodiment, the first electronic device 100 may display the user interface on a call establishment screen, based on the screen display information stored in the memory 140.

Figure 16:
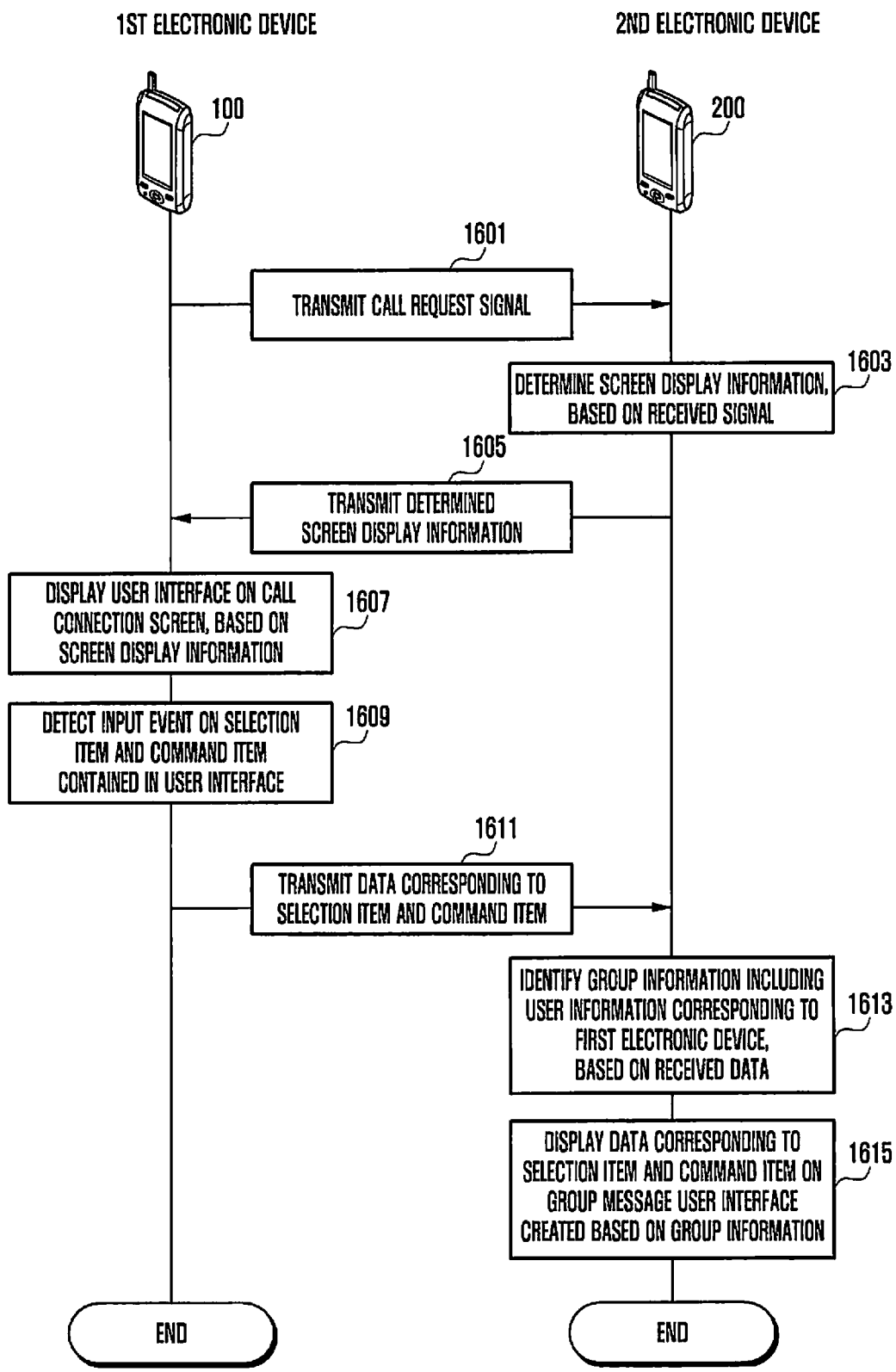
FIG. 16 illustrates a flow diagram for transmitting and receiving content between electronic devices according to an embodiment.

FIG. 16 illustrates a flow diagram for transmitting and receiving content between the electronic devices 100 and 200 according to an embodiment.

At operation 1601, the first electronic device 100 transmits a call request signal to the second electronic device 200. At operation 1603, the second electronic device 200 determines screen display information, based on the received signal. For example, the second electronic device 200 may identify user information corresponding to the first electronic device 100 and then determine screen display information corresponding to group information contained in the identified user information.

At operation 1605, the second electronic device 200 transmits the determined screen display information to the first electronic device 100. For example, the determined screen display information may be an HTML form or a compressed form. At operation 1607, the first electronic device 100 displays a user interface, based on the screen display information.

At operation 1609, the first electronic device 100 detects an input event on a selection item or a command item contained in a user interface. At operation 1611, the first electronic device 100 transmits data corresponding to the selection item and the command item to the second electronic device 200. The selection item may be an image for entering a rating or text data. The command item may be a shortcut icon for sending a selection of the selection item to the second electronic device 200.

At operation 1613, the second electronic device 200 identifies group information including user information corresponding to the first electronic device 100, based on the received data. For example, if user information corresponding to the first electronic device 100 is contained in business group information, the second electronic device 200 may extract the user information contained in the business group.

At operation 1615, the second electronic device 200 displays data corresponding to the selection item and the command item on a group message user interface created on the basis of group information. The group message user interface may be a window through which a plurality of users can transmit or receive audio data or text data. For example, the text data received from the second electronic device 200 may be displayed on the group message user interface. The text data received from a plurality of electronic devices may be sequentially displayed in the group message user interface.

Figure 17:
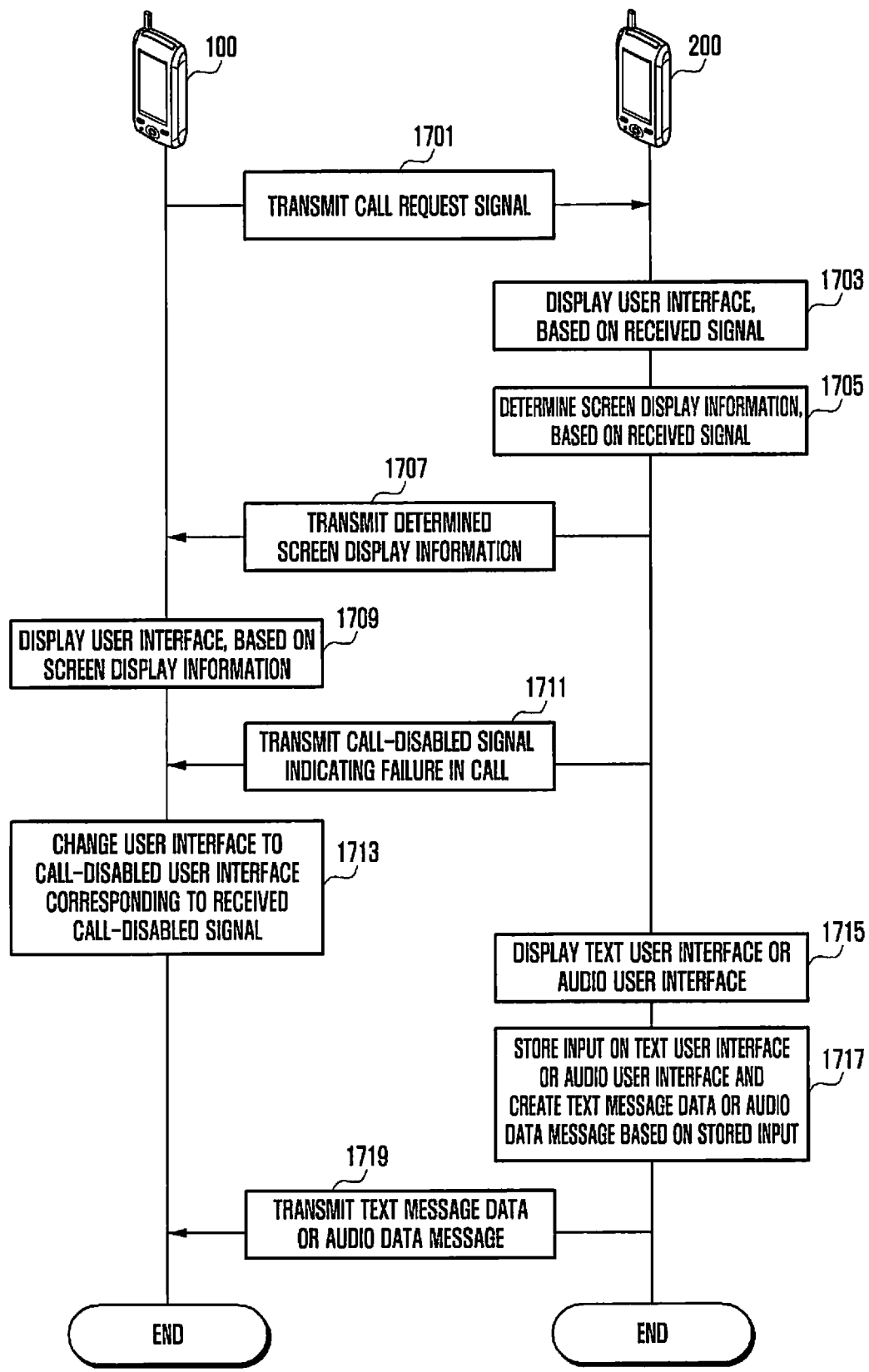
FIG. 17 illustrates a flow diagram for transmitting and receiving content between electronic devices according to an embodiment.

FIG. 17 illustrates a flow diagram for transmitting and receiving content between the electronic devices 100 and 200 according to an embodiment.

At operation 1701, the first electronic device 100 transmits a call request signal to the second electronic device 200. At operation 1703, the second electronic device 200 displays a user interface, based on the received signal. For example, the second electronic device 200 may display a user interface on one area of a screen of the second electronic device 200, based on the received signal.

At operation 1705, the second electronic device 200 determines screen display information, based on the received signal. For example, the second electronic device 200 may identify user information corresponding to the first electronic device 100 and then determine screen display information corresponding to group information contained in the identified user information.

At operation 1707, the second electronic device 200 transmits the determined screen display information to the first electronic device 100. For example, the determined screen display information may be an HTML form or a compressed form. At operation 1709, the first electronic device 100 displays a user interface, based on screen display information. The user interface may contain an image item, a thumbnail image, text data, etc. which offers information.

At operation 1711, the second electronic device 200 transmits a call-disabled signal indicating a failure in a call to the first electronic device 100. For example, the call-disabled signal may be created when the second electronic device 200 fails to respond to the call request signal of the first electronic device 100 within a predetermined threshold time or detects an input for rejecting a call.

At operation 1713, the first electronic device 100 changes the displayed user interface to a call-disabled user interface corresponding to the received call-disabled response signal. For example, the call-disabled response signal may contain screen display information to be changed. The changed user interface may contain a text image item or an audio image item to be transmitted to the second electronic device 200. For example, the first electronic device 100 may detect an input on the text image item or the audio image item, and then transmit text data or audio data corresponding to the detected input to the second electronic device 200. In a further example, the first electronic device 100 may detect an input (e.g., a text input (e.g., I called to know when to be over.)) on the call-disabled user interface changed in response to reception of the call-disabled response signal, and then transmit text data regarding the detected input to the second electronic device 200.

At operation 1715, the second electronic device 200 displays a text user interface or an audio user interface. At operation 1717, the second electronic device 200 stores an input on the text user interface or the audio user interface and, based on the stored input, creates text message data or audio message data. For example, using the audio user interface, the second electronic device 200 may store audio data such as "driving".

Figure 18:
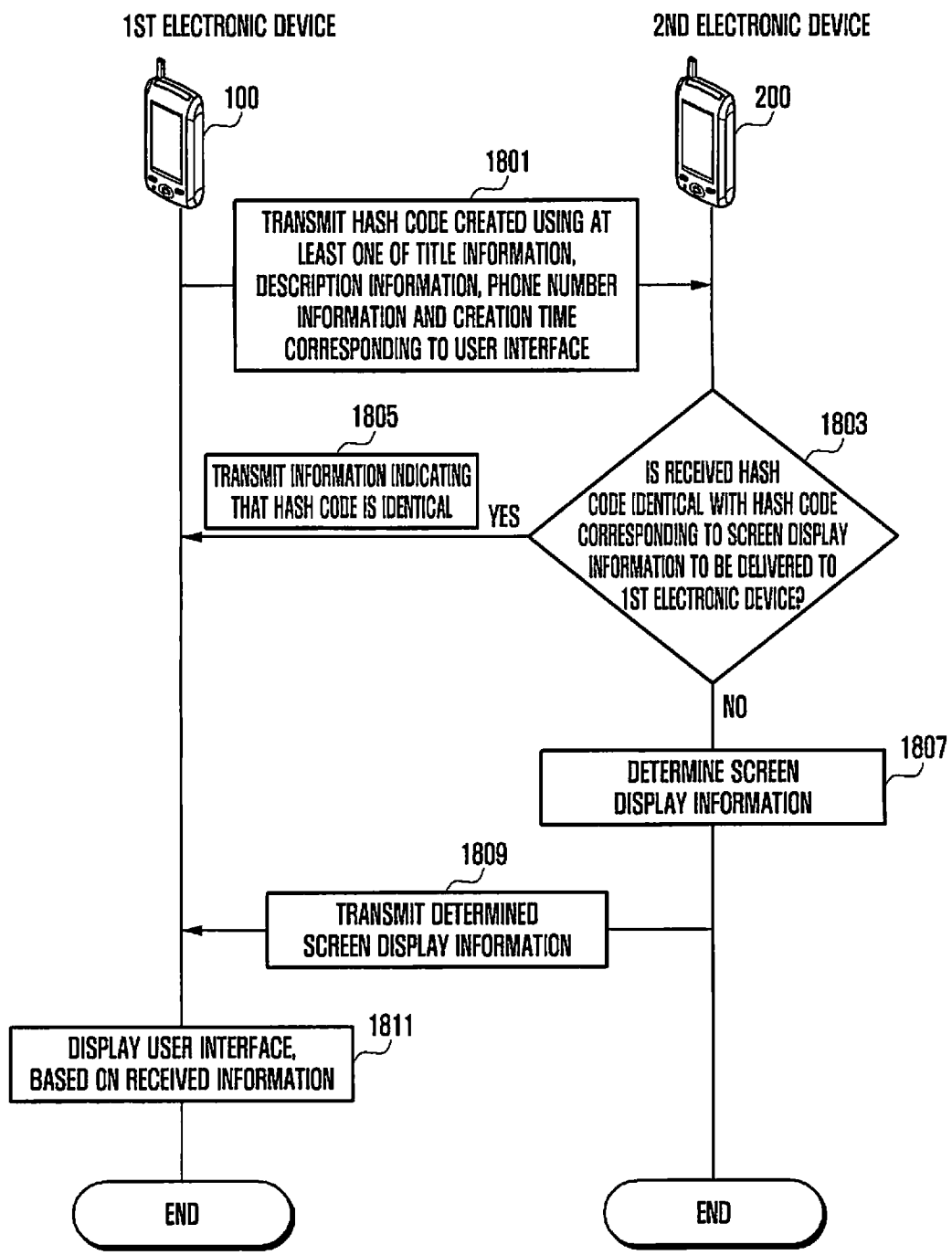
FIG. 18 illustrates a flow diagram for transmitting and receiving content between electronic devices according to an embodiment.

At operation 1719, the second electronic device 200 transmits the text message data or the audio data message to the first electronic device 100. FIG. 18 illustrates a flow diagram for transmitting and receiving content between the electronic devices 100 and 200 according to an embodiment.

At operation 1801, the first electronic device 100 transmits a hash code created using at least one of title information, description information, phone number information, and creation time which correspond to a user interface.

At operation 1803, the second electronic device 200 determines whether the received hash code is identical with a hash code corresponding to screen display information to be delivered to the first electronic device 100. At operation 1805, if it is determined that the hash code is identical, the second electronic device 200 sends, to the first electronic device 100, information indicating that the hash code is identical. At operation 1807, if it is determined that the hash code is not identical, the second electronic device determines updated screen display information.

According to an embodiment, if a network environment for transmitting and receiving a hash code is less than predefined criteria, a user interface may be displayed on the basis of previously stored screen display information. For example, if the first electronic device 100 fails to transmit a hash code to the second electronic device 200, the first electronic device 100 may display the user interface, based on the screen display information previously stored in the first electronic device 100.

At operation 1809, the second electronic device 200 transmits the determined screen display information to the first electronic device 100. At operation 1811, the first electronic device 100 displays a user interface, based on the received information.

Figure 19:
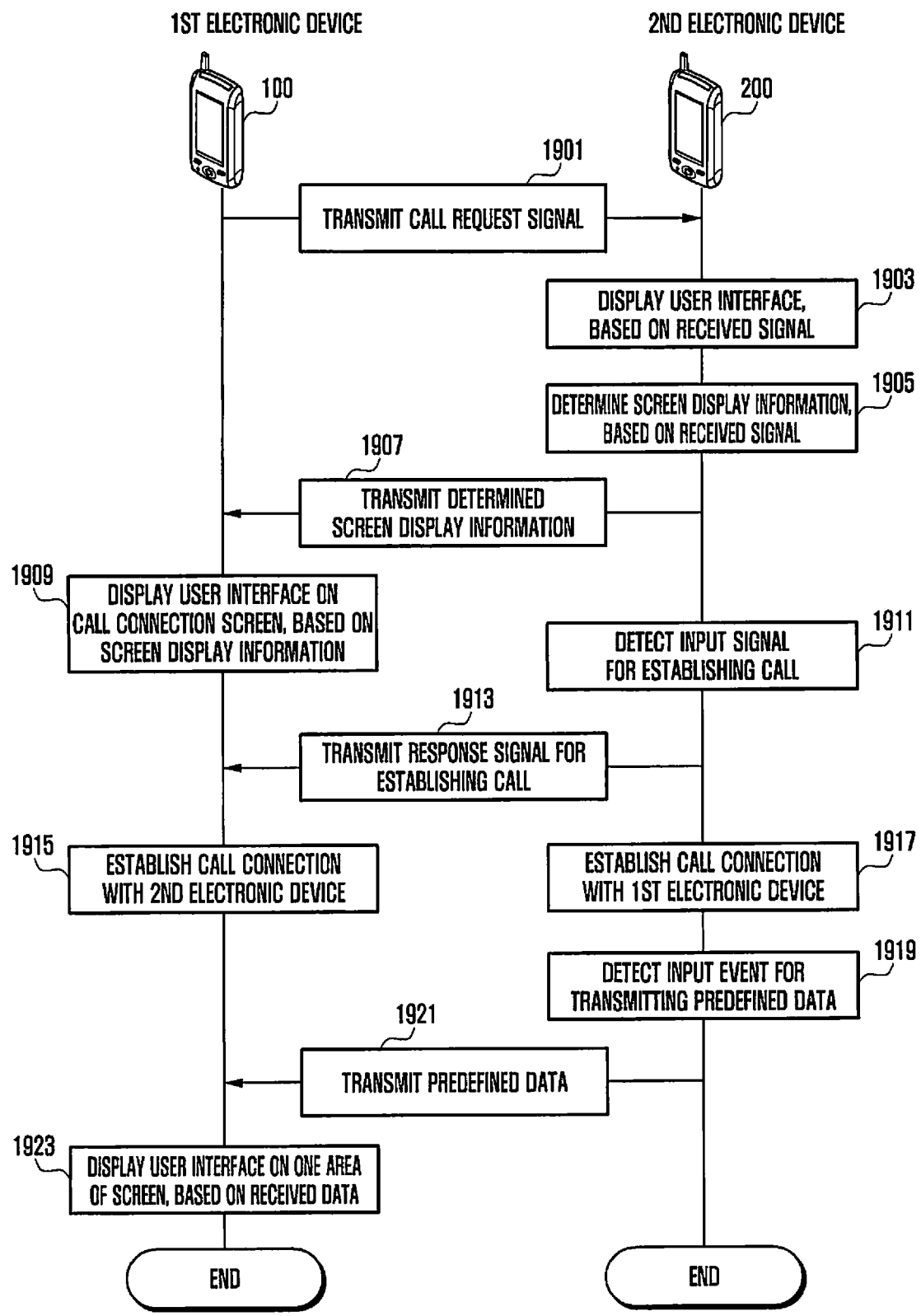
FIG. 19 illustrates a flow diagram for transmitting and receiving content between electronic devices according to an embodiment.

FIG. 19 illustrates a flow diagram for transmitting and receiving content between the electronic devices 100 and 200 according to an embodiment.

At operation 1901, the first electronic device 100 sends a call request signal to the second electronic device 200. At operation 1903, the second electronic device 200 displays a user interface, based on the received signal. At operation 1905, the second electronic device 200 determines screen display information to be transmitted, based on the received signal. At operation 1907, the second electronic device 200 transmits the determined screen display information. At operation 1909, the first electronic device 100 displays a user interface on a call connection screen, based on the screen display information. At operation 1911, the second electronic device 200 detects an input signal for establishing a call. At operation 1913, the second electronic device 200 transmits a response signal for establishing a call.

An operation 1915, the first electronic device 100 establishes a call connection with the second electronic device 200. At operation 1917, the second electronic device 200 establishes a call connection with the first electronic device 100. At operation 1919, the second electronic device 200 detects an input event for transmitting predefined data. At operation 1921, the second electronic device 200 transmits the predefined data. For example, the data transmitted by the second electronic device 200 may include status information (e.g., silent mode setting information, battery charging state information, etc.) of the second electronic device 200. A header of transmitting data packet may contain a value (e.g., a phone number of another electronic device (e.g., the electronic device 200), etc,) that indicates another electronic device (e.g., the electronic device 200).

At operation 1923, the first electronic device 100 displays the user interface on one area of a screen, based on the received data.

Figure 20:
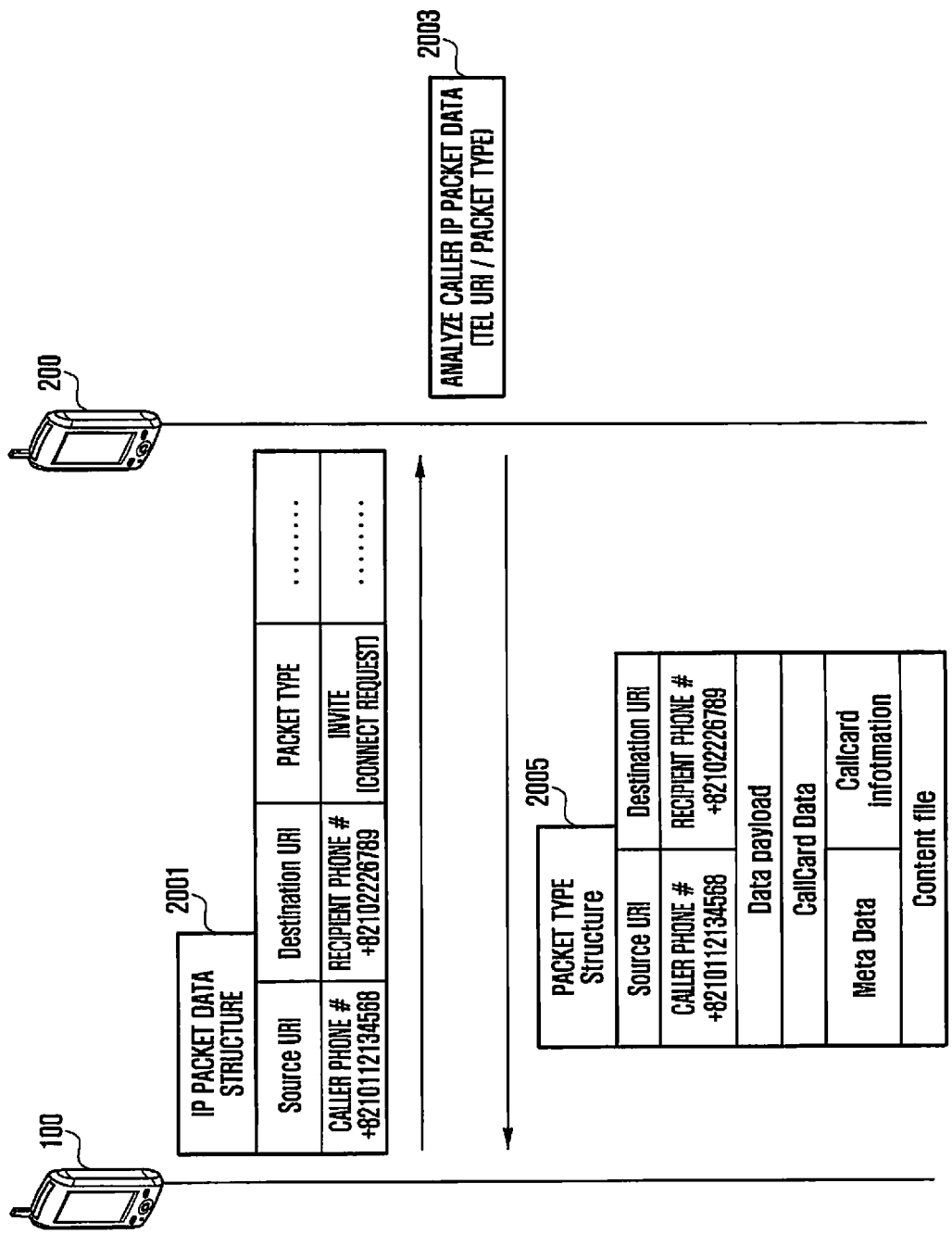
FIG. 20 illustrates a flow diagram for transmitting and receiving content between electronic devices according to an embodiment.

FIG. 20 illustrates a flow diagram for transmitting and receiving content between the electronic devices 100 and 200 according to an embodiment.

Referring to FIG. 20, the first electronic device 100 and the second electronic device 200 may transmit and receive data. When exchanging data, the first electronic device 100 and the second electronic device 200 may add a unique ID (UID) in a header of a data packet transmitted to the counterpart. Here, the UID may be a phone number, IP, ID, etc. of the counterpart, and such information may be determined after or before a call is connected.

At operation 2001, the first electronic device 100 may send packet data to the second electronic device 200. The packet data may contain a source URI, a destination URI, and a packet type. The source URI is a caller's phone number (e.g., +82101124568), and the destination URI may include a recipient phone number (e.g., +82102226789). The packet type may be a connection request signal (e.g., invite, etc.). At operation 2003, the second electronic device 200 may analyze the received packet data. For example, the second electronic device 200 may analyze the source URI, the destination URI, the packet type, etc. contained in the received packet data.

At operation 2005, the second electronic device 200 may transmit response packet data to the first electronic device 100, based on a packet data analysis result received from the first electronic device 100. The response packet data may contain a source URI, a destination URI, a data payload, user interface data (callcard data), meta data, user interface information (callcard information), and a content file. The source URI is a caller's phone number (e.g., 82102226789), and the destination URI may include recipient phone number (e.g., 82101124568).

Figure 21:
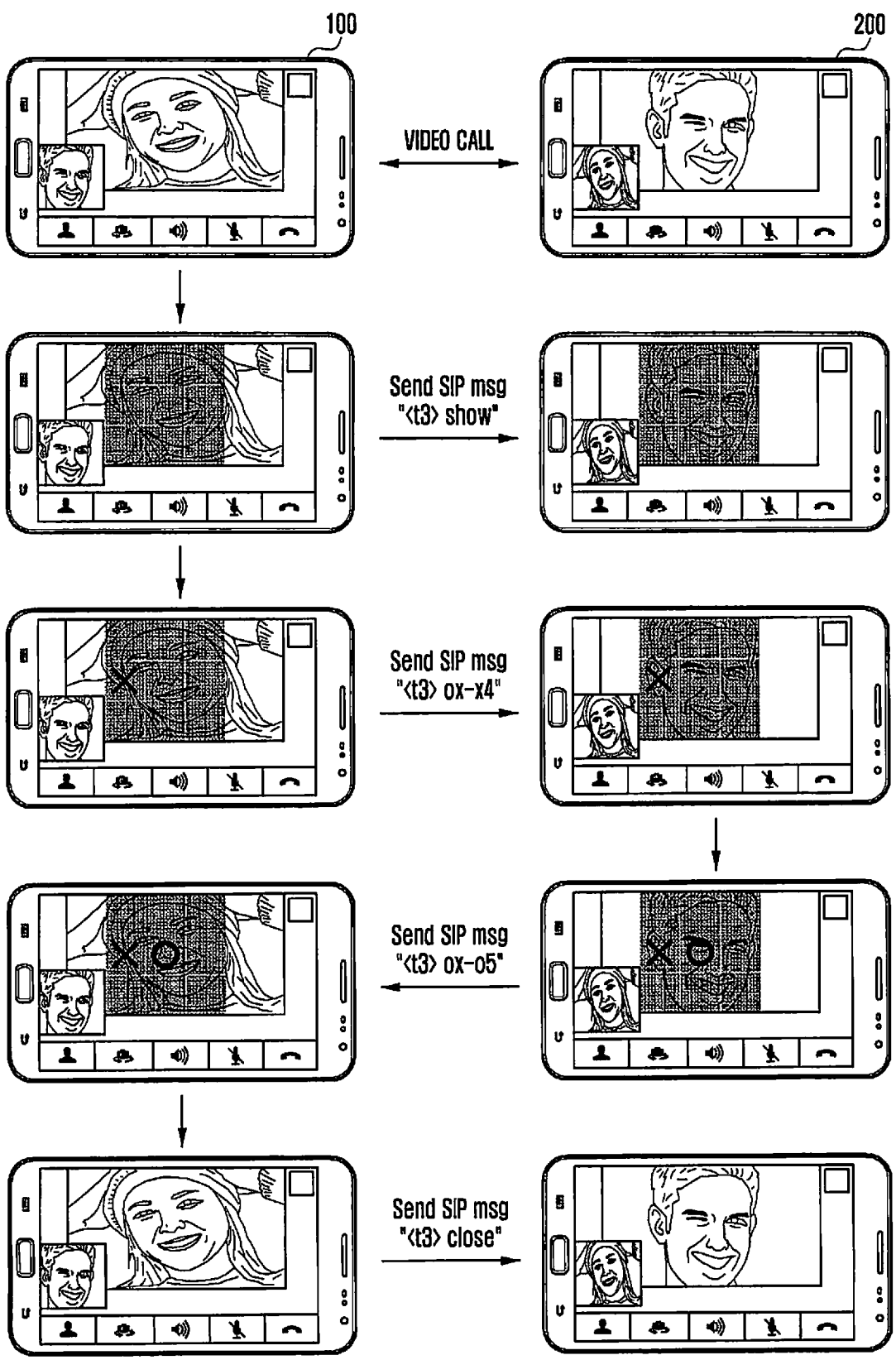
FIG. 21 illustrates an example of performing a video call between electronic devices according to an embodiment.

FIG. 21 illustrates an example of performing a video call between the electronic devices 100 and 200 according to an embodiment. Herein, the electronic device 100 may be referred to as the first electronic device 100, and the electronic device 200 may be referred to as the second electronic device 200.

According to an embodiment of this invention, the first electronic device 100 may perform a video call with the second electronic device 200. For example, if the first electronic device 100 may transmit a signal for requesting a video call to the second electronic device 200 and, when receiving a response signal from the second electronic device 200, perform a video call with the second electronic device 200.

According to an embodiment, while a video call is performed, the first electronic device 100 may control an image corresponding to the first electronic device 100 and an image corresponding to the second electronic device 200 to be displayed on one area of a screen. The displayed image corresponding to the first electronic device 100 may be greater in size than the displayed image corresponding to the second electronic device 200.

According to an embodiment, the first electronic device 100 may control a user interface for offering a previously stored functions to be displayed on one area of the screen. The user interface may be a game application (e.g., a nine grid-shaped bingo game, etc.). The user interface may be overlaid or blurred on a displayed image. When an input event (e.g., a command event for indicating an additional item, etc.) is detected on a user interface, the first electronic device 100 may control data corresponding to the detected input event to be transmitted to the second electronic device 200 by using a session initiation protocol (SIP). The session initiation protocol may be a structure for controlling an application-layer signaling protocol, the creation of a multimedia service session such as an internet-based conference, and the like.

For example, using the SIP, the first electronic device 100 may transmit a command (e.g., <t3> show) to display a user interface to the second electronic device 200. The second electronic device 200 that receives the command may control the user interface to be displayed. In another example, using the SIP, the first electronic device 100 may transmit a command (e.g., <t3> ox-x4) to change the user interface to the second electronic device 200. Herein, <t3> ox-x4 may be a command to request an X mark in a region corresponding to the fourth grid in nine grid-shaped checkered game. When a signal requesting the X mark is received from the first electronic device 100, the second electronic device 200 may mark X on the region corresponding to the fourth grid of nine grid shapes.

For example, the second electronic device 200 may send a command (e.g., <t3> ox-o5) to change the user interface to the first electronic device 100. Based on the received command, the first electronic device 100 may mark O in the region corresponding to the fifth grid in nine grid-shaped checkered game. In another example, when the first electronic device 100 or the second electronic device 200 transmits or receives a command to terminate a checkered game by using SIP, the first electronic device 100 or the second electronic device 200 may end the checkered game.

FIG. 22 illustrates a flow diagram for performing a video call between the electronic devices 100 and 200 according to an embodiment.

At operation 2201, the first electronic device 100 performs a video call with the second electronic device 200. At operation 2203, the first electronic device 100 displays an image corresponding to the electronic device 100 and an image corresponding to another electronic device (e.g., the electronic device 200) on one area of a screen during the video call. At operation 2205, the second electronic device 200 displays an image corresponding to the electronic device 200 and an image corresponding to another electronic device (e.g., the electronic device 100) on one area of a screen during the video call. At operation 2207, the first electronic device 100 displays a user interface that offers a previously stored function. The user interface may be a game application (e.g., a nine grid-shaped bingo game, etc.).

At operation 2209, the first electronic device 100 sends a request signal for displaying a user interface to the second electronic device 200. At operation 2211, the second electronic device 200 displays a user interface that offers a previously stored function. At operation 2213, the first electronic device 100 detects an input event for changing the user interface. At operation 2215, the first electronic device 100 changes and displays the user interface, based on the detected input event. At operation 2217, using a session initiation protocol, the first electronic device 100 transmits data corresponding to the detected input event to the second electronic device 200. At operation 2219, the second electronic device 200 changes the user interface, based on the received data.

According to an embodiment, the first electronic device 100 may transmit data corresponding to the detected input event to the second electronic device 200 by using a session initiation protocol (SIP).

While the present disclosure has been particularly shown and described with reference to an exemplary embodiment thereof, it will be understood by those skilled in the art that various changes in form and details may be made therein without departing from the scope of the invention as defined by the appended claims.

The invention claimed is:

1. An electronic device comprising:
a communication controller configured to transmit a call request signal to another electronic device and to receive first screen display information stored in the another electronic device, from the another electronic device;
a display configured to display the first screen display information on a call connection screen based on user information identified after the call request is received by the another electronic device; and
a processor configured to control the communication controller to transmit data corresponding to an input event to the another electronic device in response to detecting the input event while displaying the first screen display information and change the displaying of the first screen display information to second screen display information on the call connection screen, in response to receiving the second screen display information from the another electronic device,
wherein the first screen display information is stored in a memory of the another electronic device based on the user information corresponding to the electronic device, and the second screen display information is created by the another electronic device based on group information contained in the user information identified after the call request is received by the another electronic device, and
wherein the first screen display information includes a selection item received from the another electronic device.

2. The electronic device of claim 1, wherein the communication controller is further configured to receive authority information for identifying status information of the another electronic device from the another electronic device, and
wherein the processor is further configured to control a request signal for the status information of the another electronic device to be transmitted, based on the received authority information, and to control the status information of the another electronic device to be received from the another electronic device through the communication controller.

3. The electronic device of claim 1, wherein the communication controller is further configured to receive a call-disabled response signal indicating a failure in a call from the another electronic device, and
wherein the processor is further configured to control the user interface to be changed to a call-disabled user interface corresponding to the received call-disabled response signal.

4. The electronic device of claim 1, wherein the communication controller is further configured to transmit, to the another electronic device, a hash code created using at least one of title information, description information, phone number information and creation time information which correspond to the user interface.

5. An electronic device comprising:
a communication controller configured to receive a call request signal from another electronic device;
a memory configured to store screen display information for user information; and
a processor configured to:
identify the user information corresponding to the another electronic device after the call request signal is received,
control the communication controller to transmit first screen display information stored in the memory corresponding to the identified user information to the another electronic device while displaying the first screen display information, in response to receiving data corresponding to an input event detected by the another electronic device from the another electronic device, create second screen display information based on group information contained in the user information identified after the call request signal is received, and
control the communication controller to transmit the second screen display information to the another electronic device while displaying the second screen display information,
wherein the first screen display information includes a selection item received from the another electronic device.

6. The electronic device of claim 5, wherein the communication controller is further configured to receive data corresponding to the selection item and a command item contained in a user interface from the another electronic device, and
wherein the processor is further configured to identify the group information including the user information corresponding to the another electronic device based on the received data, and to control the data corresponding to the selection item and the command item to be displayed on a group message user interface created based on the group information.

7. The electronic device of claim 5, wherein the communication controller is further configured to transmit authority information for identifying status information of the electronic device to the another electronic device, and to, when a request signal is received for the status information of the electronic device from the another electronic device, transmit the status information of the electronic device in response to the request signal.

8. The electronic device of claim 5, wherein the communication controller is further configured to transmit a call-disabled signal indicating a failure in a call to the another electronic device, and
wherein the processor is further configured to control a text user interface or an audio user interface to be displayed, to store an input on the text user interface or the audio user interface, to create text message data or audio message data, based on the stored input, and to control the created text message data or the created audio message data to be transmitted to the another electronic device through the communication controller.

9. The electronic device of claim 5, wherein the processor is further configured to control a hash code created using at least one of title information, description information, phone number information and creation time information, which correspond to a user interface, to be received from the another electronic device through the communication controller, to compare the received hash code with a hash code corresponding to screen display information to be delivered to the another electronic device, and to determine screen display information to be delivered to the another electronic device, based on a result of comparison.

10. The electronic device of claim 5, wherein the processor is further configured to control the determined screen display information to be converted into an HTML form or to be compressed and then to be transmitted to the another electronic device.

11. An electronic device comprising:
a communication controller configured to establish a call connection with another electronic device and to receive display data from the another electronic device during the call connection with the another electronic device based on group information stored in the another electronic device; and
a processor configured to:
identify user information corresponding to the group information stored in the another electronic device after the call connection is established with the another electronic device,
distinguish a first area for displaying information associated with the call connection with the another electronic device from a second area displayed based on the display data received from the another electronic device, and
display the identified user information in the first area and the received display data in the second area,
wherein the first area is a fixed area, and the second area is a variable and scrollable area depending on a user's selection, and
wherein the received display data includes a selection item received from the another electronic device.

12. The electronic device of claim 11, wherein the communication controller is further configured to receive data associated with status information of the another electronic device from the another electronic device,
wherein the data includes at least one of an information value indicating the another electronic device and an internet address value associated with the another electronic device.

* * * * *